(12) United States Patent
Yu et al.

(10) Patent No.: US 12,189,181 B2
(45) Date of Patent: Jan. 7, 2025

(54) OPTOELECTRONIC DEVICE

(71) Applicant: ROCKLEY PHOTONICS LIMITED, Altrincham (GB)

(72) Inventors: Guomin Yu, Glendora, CA (US); Aaron John Zilkie, Pasadena, CA (US); Andrew George Rickman, Marlborough (GB)

(73) Assignee: Rockley Photonics Limited, Altrincham (GB)

( * ) Notice: Subject to any disclaimer, the term of this patent is extended or adjusted under 35 U.S.C. 154(b) by 163 days.

(21) Appl. No.: 17/848,328

(22) Filed: Jun. 23, 2022

(65) Prior Publication Data

US 2023/0090189 A1 Mar. 23, 2023

Related U.S. Application Data

(60) Provisional application No. 63/247,297, filed on Sep. 22, 2021.

(51) Int. Cl.
*G02B 6/122* (2006.01)
*G02B 6/12* (2006.01)
*G02B 6/13* (2006.01)
*G02F 1/025* (2006.01)

(52) U.S. Cl.
CPC ....... *G02B 6/1223* (2013.01); *G02B 6/12004* (2013.01); *G02B 6/122* (2013.01); *G02B 6/13* (2013.01); *G02B 2006/12061* (2013.01); *G02F 1/025* (2013.01)

(58) Field of Classification Search
CPC ... G02B 6/12–126; G02B 2006/12035–12097; G02B 6/14; G02F 1/025
See application file for complete search history.

(56) References Cited

U.S. PATENT DOCUMENTS

| | | | |
|---|---|---|---|
| 5,163,118 | A | 11/1992 | Lorenzo et al. |
| 5,939,729 | A | 8/1999 | Chu et al. |
| 6,154,475 | A | 11/2000 | Soref et al. |
| 6,222,951 | B1 | 4/2001 | Huang |

(Continued)

FOREIGN PATENT DOCUMENTS

| | | |
|---|---|---|
| CN | 102162137 A | 8/2011 |
| CN | 105612612 A | 5/2016 |

(Continued)

OTHER PUBLICATIONS

Machine translation of WO 2022264202 A1, 6 pages. (Year: 2022).*
(Continued)

*Primary Examiner* — Daniel Petkovsek
*Assistant Examiner* — Emma R. Oxford
(74) *Attorney, Agent, or Firm* — Lewis Roca Rothgerber Christie LLP

(57) ABSTRACT

An optoelectronic device. The optoelectronic device including: a silicon platform, including a silicon waveguide and a cavity, wherein a bed of the cavity is provided at least in part by a buried oxide layer; a III-V semiconductor-based optoelectronic component, bonded to a bed of the cavity of the silicon platform; and a bridge-waveguide, located between the silicon waveguide and the III-V semiconductor-based optoelectronic component.

18 Claims, 40 Drawing Sheets

(56) References Cited

U.S. PATENT DOCUMENTS

| | | | |
|---|---|---|---|
| 6,509,139 B1* | 1/2003 | Roberts | G02B 6/13 430/324 |
| 7,257,283 B1 | 8/2007 | Liu et al. | |
| 7,391,801 B1 | 6/2008 | Soref et al. | |
| 8,106,379 B2 | 1/2012 | Bowers | |
| 8,160,404 B2 | 4/2012 | Pan et al. | |
| 8,330,242 B2 | 12/2012 | Shiba et al. | |
| 8,710,470 B2 | 4/2014 | Gattass et al. | |
| 8,767,792 B2 | 7/2014 | Bowers et al. | |
| 8,768,132 B2 | 7/2014 | Stewart et al. | |
| 9,097,846 B2 | 8/2015 | Mizrahi et al. | |
| 9,134,553 B2 | 9/2015 | Lim et al. | |
| 9,209,142 B1 | 12/2015 | Lambert et al. | |
| 9,368,579 B2 | 6/2016 | Balram et al. | |
| 9,500,807 B2 | 11/2016 | Oka | |
| 9,513,498 B2 | 12/2016 | Jones et al. | |
| 9,768,195 B2 | 9/2017 | Chou et al. | |
| 9,922,967 B2 | 3/2018 | Krasulick | |
| 10,340,661 B2 | 7/2019 | Caër et al. | |
| 10,809,547 B2* | 10/2020 | Yu | G02B 6/136 |
| 10,831,043 B2* | 11/2020 | Yu | G02F 1/017 |
| 11,126,020 B2* | 9/2021 | Yu | G02F 1/01708 |
| 11,784,456 B2* | 10/2023 | Yu | H01S 5/021 372/6 |
| 2002/0172464 A1 | 11/2002 | Delwala | |
| 2003/0003734 A1 | 1/2003 | Delwala | |
| 2003/0003735 A1 | 1/2003 | Deliwala | |
| 2003/0003736 A1 | 1/2003 | Delwala | |
| 2003/0003737 A1 | 1/2003 | Delwala | |
| 2003/0003738 A1 | 1/2003 | Delwala | |
| 2004/0069984 A1 | 4/2004 | Estes et al. | |
| 2004/0207016 A1 | 10/2004 | Patel et al. | |
| 2004/0258347 A1 | 12/2004 | Gothoskar et al. | |
| 2005/0189591 A1 | 9/2005 | Gothoskar et al. | |
| 2005/0236619 A1 | 10/2005 | Patel et al. | |
| 2006/0177173 A1 | 8/2006 | Shastri et al. | |
| 2008/0073744 A1 | 3/2008 | Masini et al. | |
| 2008/0267239 A1 | 10/2008 | Hall et al. | |
| 2009/0016666 A1 | 1/2009 | Kuo et al. | |
| 2009/0245298 A1 | 10/2009 | Sysak et al. | |
| 2009/0324164 A1 | 12/2009 | Reshotko et al. | |
| 2010/0247021 A1 | 9/2010 | Cunningham et al. | |
| 2010/0247022 A1 | 9/2010 | Li et al. | |
| 2010/0247029 A1 | 9/2010 | Li et al. | |
| 2010/0330727 A1 | 12/2010 | Hill et al. | |
| 2011/0012221 A1 | 1/2011 | Fujikata et al. | |
| 2011/0170819 A1 | 7/2011 | Zheng et al. | |
| 2011/0215344 A1 | 9/2011 | Dardy et al. | |
| 2011/0299561 A1 | 12/2011 | Akiyama | |
| 2012/0001210 A1 | 1/2012 | Mochizuki | |
| 2012/0168816 A1 | 7/2012 | Sweeney | |
| 2012/0207424 A1 | 8/2012 | Zheng et al. | |
| 2012/0207479 A1 | 8/2012 | Krishnamoorthy et al. | |
| 2012/0219250 A1 | 8/2012 | Ren et al. | |
| 2012/0300796 A1 | 11/2012 | Sysak et al. | |
| 2013/0039664 A1 | 2/2013 | Clifton et al. | |
| 2013/0051727 A1 | 2/2013 | Mizrahi et al. | |
| 2013/0195137 A1 | 8/2013 | Bowers et al. | |
| 2013/0279845 A1 | 10/2013 | Kobrinsky et al. | |
| 2013/0285184 A1 | 10/2013 | Li | |
| 2013/0321816 A1 | 12/2013 | Dattner et al. | |
| 2014/0061677 A1 | 3/2014 | Jakoby et al. | |
| 2014/0204352 A1* | 7/2014 | Mochizuki | H01S 5/0203 257/94 |
| 2014/0270618 A1 | 9/2014 | Dinu et al. | |
| 2014/0307997 A1 | 10/2014 | Bar et al. | |
| 2014/0319656 A1 | 10/2014 | Marchena et al. | |
| 2014/0334768 A1 | 11/2014 | Chang et al. | |
| 2014/0338726 A1 | 11/2014 | Nobori | |
| 2015/0097210 A1 | 4/2015 | Krasulick et al. | |
| 2015/0098676 A1 | 4/2015 | Krasulick et al. | |
| 2015/0125111 A1 | 5/2015 | Orcutt et al. | |
| 2015/0270684 A1 | 9/2015 | Suzuki et al. | |
| 2016/0043262 A1 | 2/2016 | Okumura | |
| 2016/0087160 A1 | 3/2016 | Cheng et al. | |
| 2016/0109731 A1 | 4/2016 | Huang | |
| 2016/0111407 A1 | 4/2016 | Krasulick | |
| 2016/0211645 A1 | 7/2016 | Padullaparthi | |
| 2016/0246016 A1 | 8/2016 | Mizrahi et al. | |
| 2016/0274319 A1 | 9/2016 | Krasulick et al. | |
| 2016/0291248 A1 | 10/2016 | HuangFu | |
| 2016/0358954 A1 | 12/2016 | Hoyos et al. | |
| 2017/0207600 A1 | 7/2017 | Klamkin et al. | |
| 2017/0229840 A1 | 8/2017 | Lambert | |
| 2017/0255077 A1 | 9/2017 | Pruessner et al. | |
| 2017/0317471 A1 | 11/2017 | Lor et al. | |
| 2018/0019139 A1 | 1/2018 | Sun et al. | |
| 2018/0081118 A1 | 3/2018 | Klamkin et al. | |
| 2018/0246351 A1 | 8/2018 | Ho et al. | |
| 2019/0140425 A1 | 5/2019 | Hahn et al. | |
| 2019/0179177 A1 | 6/2019 | Rickman et al. | |
| 2019/0258094 A1* | 8/2019 | Oh | G02F 1/025 |
| 2019/0293971 A1* | 9/2019 | Yu | G02F 1/017 |
| 2019/0377203 A1 | 12/2019 | Yu et al. | |
| 2019/0384003 A1 | 12/2019 | Painchaud et al. | |
| 2019/0384073 A1* | 12/2019 | Yu | G02B 6/12004 |
| 2020/0041721 A1* | 2/2020 | Yu | H01L 21/6835 |
| 2020/0124878 A1 | 4/2020 | Yu et al. | |
| 2020/0363662 A1 | 11/2020 | Yu et al. | |
| 2021/0111301 A1 | 4/2021 | Yu | |
| 2022/0155521 A1* | 5/2022 | Yu | G02B 6/13 |
| 2022/0276438 A1 | 9/2022 | Yu et al. | |
| 2022/0381986 A1* | 12/2022 | Young | G02B 6/1221 |

FOREIGN PATENT DOCUMENTS

| | | | |
|---|---|---|---|
| GB | 2334789 A * | 9/1999 | G02B 6/122 |
| GB | 2573586 A | 11/2019 | |
| GB | 2577608 A | 4/2020 | |
| GB | 2586889 A | 3/2021 | |
| GB | 2589335 A | 6/2021 | |
| GB | 2592282 A | 8/2021 | |
| JP | 7-74396 A | 3/1995 | |
| JP | 2005-300678 A | 10/2005 | |
| JP | 2012-151327 A | 8/2012 | |
| JP | 2014-525608 A | 9/2014 | |
| JP | 2016-533027 A | 10/2016 | |
| WO | WO 2017/139350 A1 | 8/2017 | |
| WO | WO 2017/197132 A1 | 11/2017 | |
| WO | WO 2018/096038 A1 | 5/2018 | |
| WO | WO 2019/101369 A1 | 5/2019 | |
| WO | WO 2019/220207 A1 | 11/2019 | |
| WO | WO 2020/030641 A1 | 2/2020 | |
| WO | 2021094473 A1 | 5/2021 | |
| WO | WO-2022264202 A1 * | 12/2022 | H01S 5/026 |

OTHER PUBLICATIONS

International Search Report and Written Opinion of the International Searching Authority, mailed Jan. 30, 2023, corresponding to PCT/EP2022/076242, 14 pages.

Zhang, J et al., "III-V-on-Si photonic integrated circuits realized using micro-transfer-printing", APL Photonics, Nov. 4, 2019, pp. 110803-1-110803-10, vol. 4, No. 11, American Institute of Physics.

European Communication pursuant to Article 94(3) EPC, for Patent Application No. 20 807 013.6, mailed Jul. 15, 2024, 4 pages.

Claussen, S.A. et al., "Selective area growth of germanium and germanium/silicon-germanium quantum wells in silicon waveguides for on-chip optical interconnect applications", Optical Materials Express, Oct. 1, 2012, pp. 1336-1342, vol. 2, No. 10, OSA.

European Patent Office Communication pursuant to Article 94(3) EPC, dated Jan. 4, 2022, for Patent Application No. GB 18 723 010.7, 5 pages.

Hashimoto, Y. et al., "Fabrication of an Anti-Reflective and Super-Hydrophobic Structure by Vacuum Ultraviolet Light-Assisted Bonding and Nanoscale Pattern Transfer", Micromachines, Apr. 15, 2018, pp. 1-11, MDPI.

International Search Report and Written Opinion of the International Searching Authority, Mailed Mar. 8, 2018, Corresponding to PCT/EP2017/080221, 13 pages.

(56) References Cited

OTHER PUBLICATIONS

International Search Report and Written Opinion of the International Searching Authority, Mailed Aug. 29, 2018, Corresponding to PCT/EP2018/062269, 15 pages.
International Search Report and Written Opinion of the International Searching Authority, mailed Feb. 25, 2021, Corresponding to PCT/EP2020/081949, 14 pages.
International Search Report and Written Opinion of the International Searching Authority issued in PCT/IB2019/000565, Sep. 17, 2019, 13 pages.
International Search Report and Written Opinion of the International Searching Authority, Mailed Nov. 10, 2020, Corresponding to PCT/EP2020/073767, 16 pages.
Japanese Notification of Reasons for Refusal, for Patent Application No. 2020-528381, mailed Feb. 22, 2022, 5 pages.
Loi, R. et al., "Transfer Printing of AlGaInAs/InP Etched Facet Lasers to Si Substrates", IEEE Photonics Journal, Dec. 2016, 11 pages, vol. 8, No. 6, IEEE.
Partial English translation of the Chinese Notification of the First Office Action, for Patent Application No. 201780038803.8, mailed Aug. 22, 2022, 16 pages.
Partial English translation of the Chinese Notification of the First Office Action, for Patent Application No. CN 201880002546.7, mailed Nov. 28, 2023, 13 pages.
Partial English translation of the Japanese Notification of Reasons for Refusal, for Patent Application No. 2020-528381, mailed Feb. 22, 2022, 5 pages.
Ren, S. et al., "Selective epitaxial growth of Ge/$Si_{0.15}Ge_{0.85}$ quantum wells on Si substrate using reduced pressure chemical vapor deposition", Applied Physics Letters, 2011, pp. 151108-1 through 151108-3, American Institute of Physics.
Ren, S., "Ge/SiGe Quantum Well Waveguide Modulator for Optical Interconnect Systems", Dissertation submitted to the department of electrical engineering and the committee on graduate studies of Stanford University in partial fulfillment of the requirements for the degree of doctor of philosophy, Mar. 2011, 138 pages.
Roelkens, G. et al., "Transfer printing for silicon photonics transceivers and interposers", 2018, pp. 13-14, IEEE.
Rouifed, Mohamed-Saïd et al., "Advances Toward Ge/SiGe Quantum-Well Waveguide Modulators at 1.3μm", IEEE Journal of Selected Topics in Quantum Electronics, 2013, 7 pages, vol. 20, No. 4, IEEE.

U.K. Intellectual Property Office Combined Search and Examination Report, Dated Sep. 27, 2018, for Patent Application No. GB1812309.1, 5 pages.
U.K. Intellectual Property Office Combined Search and Examination Report, Dated Sep. 27, 2018 and re-sent by Examiner Sep. 26, 2019, for Patent Application No. GB1812309.1, 7 pages.
U.K. Intellectual Property Office Combined Search and Examination Report, dated Feb. 17, 2020, for Patent Application No. GB1912499.9, 5 pages.
U.K. Intellectual Property Office Search and Examination Report, dated Apr. 8, 2020, for Patent Application No. GB1916700.6, 6 pages.
U.K. Intellectual Property Office Search and Examination Report, dated Feb. 23, 2022, for Patent Application No. GB2118589.7, 5 pages.
U.K. Intellectual Property Office Search and Examination Report, Dated Apr. 17, 2020, for Patent Application No. GB1915085.3, 5 pages.
U.K. Intellectual Property Office Search and Examination Report, dated Dec. 21, 2021, for Patent Application No. GB 1915085.3, 4 pages.
U.K. Intellectual Property Office Search Report, dated Nov. 25, 2021, for Patent Application No. GB1916700.6, 6 pages.
U.S. Notice of Allowance for U.S. Appl. No. 16/463,203, dated Aug. 31, 2020, 8 pages.
U.S. Office Action for U.S. Appl. No. 16/427,247, dated Apr. 15, 2020, 14 pages.
U.S. Office Action for U.S. Appl. No. 16/463,203, dated Apr. 16, 2020, 13 pages.
U.S. Office Action for U.S. Appl. No. 16/766,268, dated Feb. 2, 2021, 16 pages.
U.S. Office Action for U.S. Appl. No. 17/002,722, dated Nov. 8, 2022, 14 pages.
U.S. Office Action from U.S. Appl. No. 17/055,541, dated Dec. 11, 2023, 7 pages.
U.S. Office Action from U.S. Appl. No. 17/439,297, dated Dec. 6, 2023, 11 pages.
U.S. Office Action from U.S. Appl. No. 17/748,639, dated Apr. 15, 2024, 12 pages.
U.S. Restriction Requirement including a list of references, from U.S. Appl. No. 17/055,541, dated Aug. 9, 2023, 9 pages.
Ye, N. et al., "High-alignment-accuracy transfer printing of passive silicon waveguide structures", Optics Express, Jan. 18, 2018, pp. 2023-2032, vol. 26, No. 2, Optical Society of America.

* cited by examiner

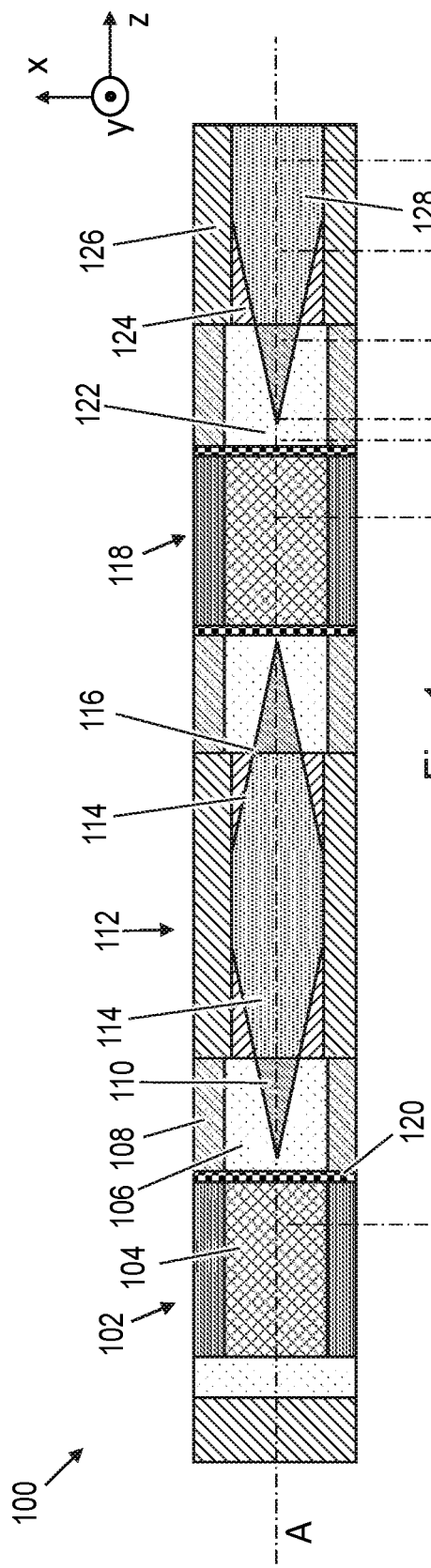
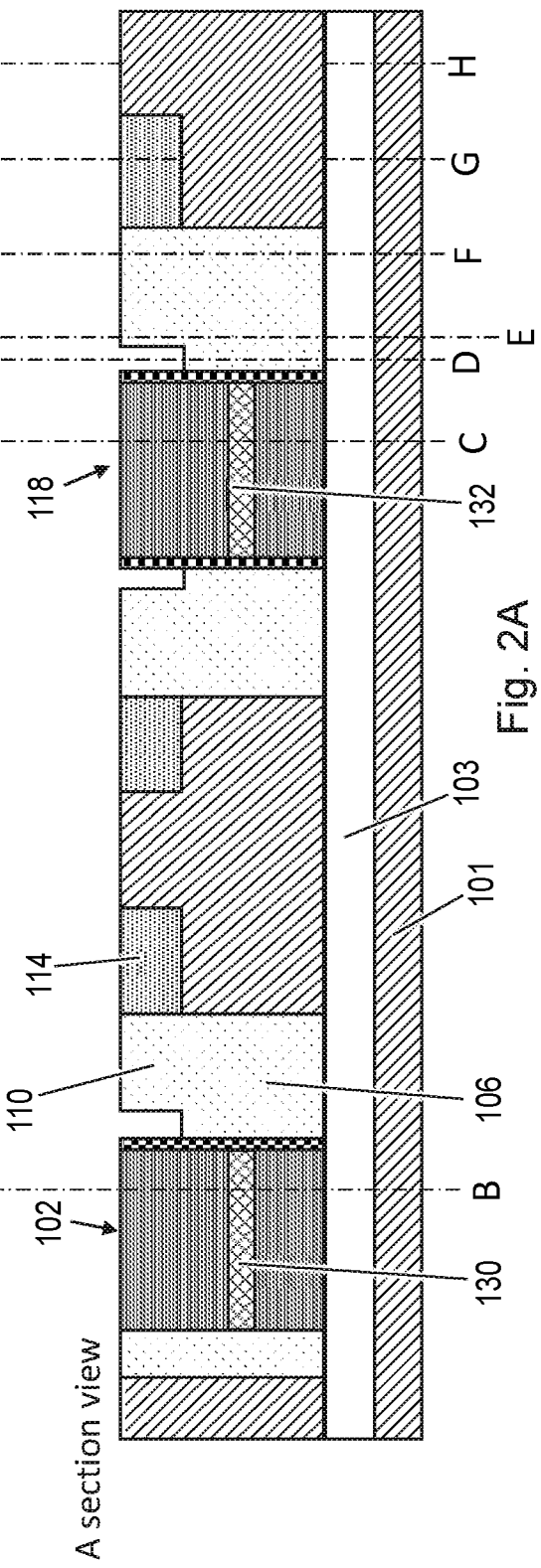
Fig. 1
Fig. 2A

W1 < W2 < W3 < W4

Top view

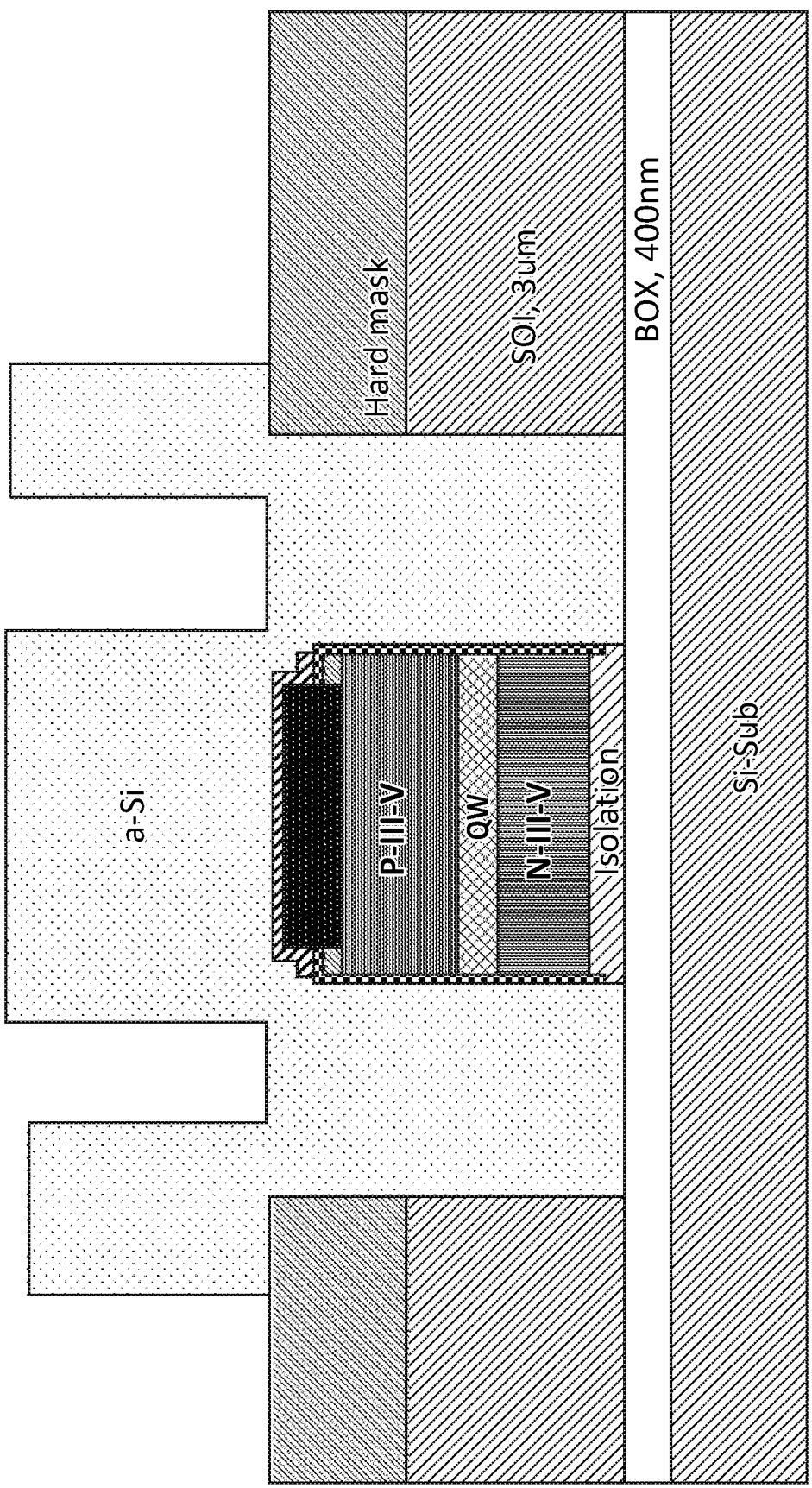
Fig. 20(III)

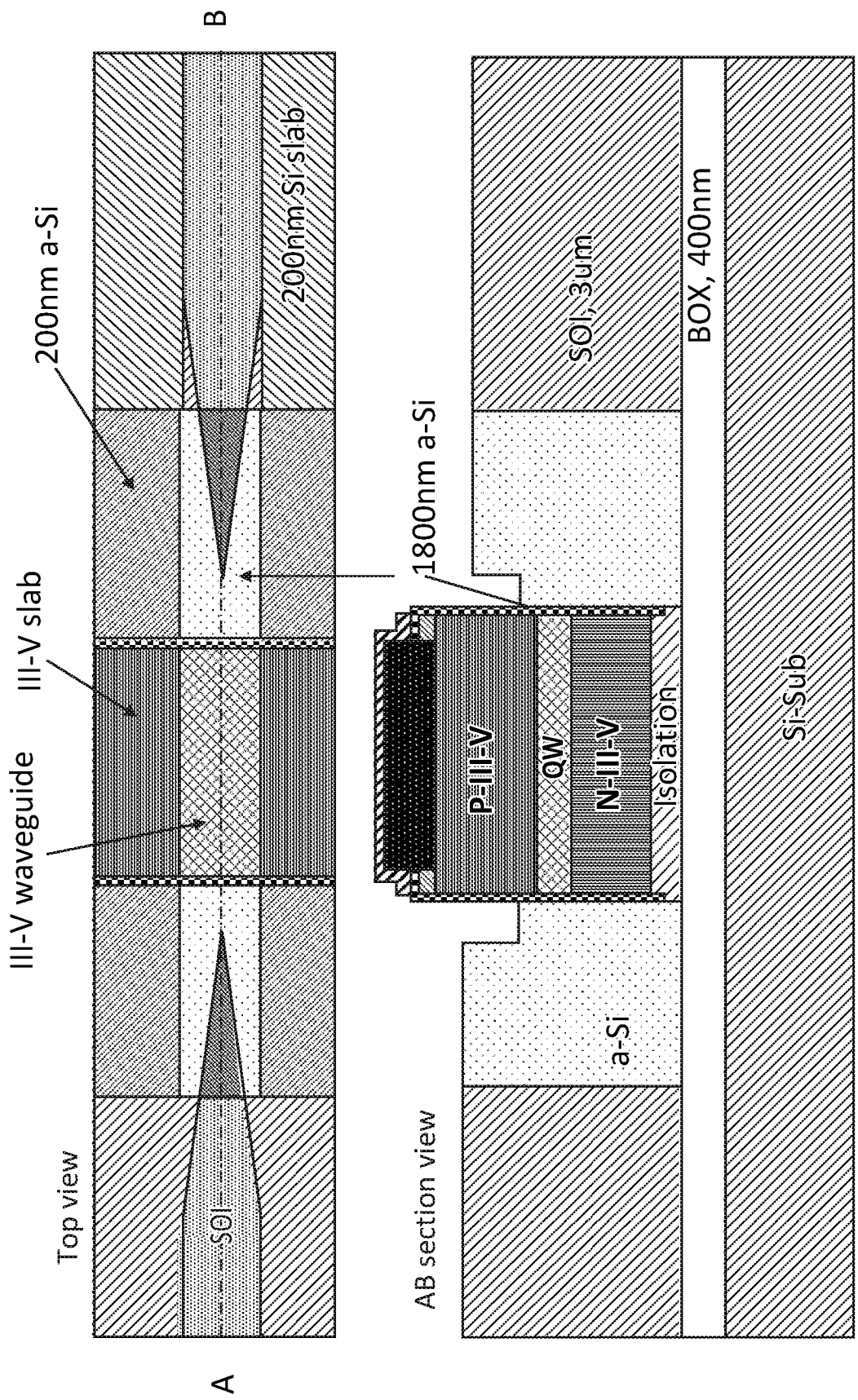

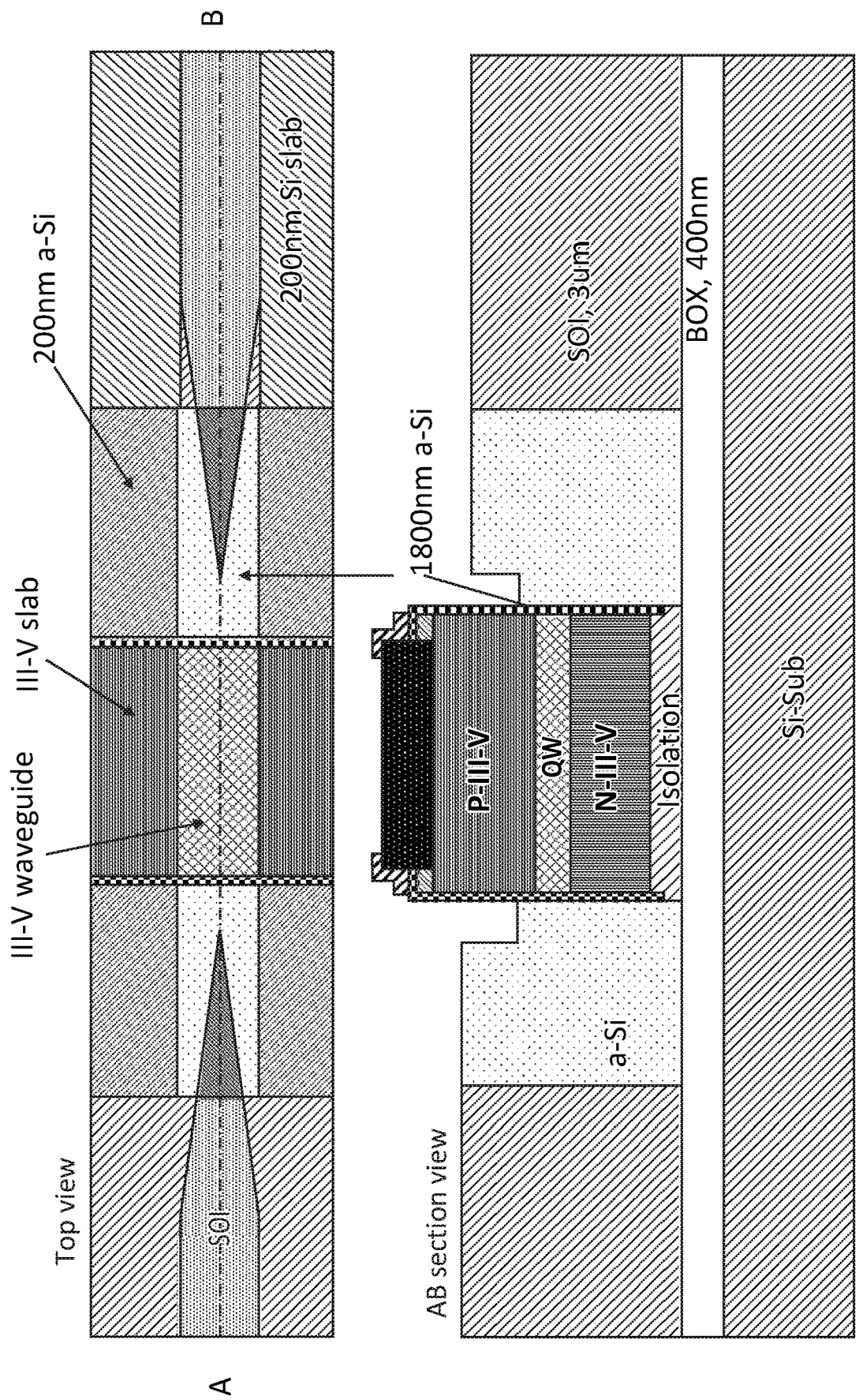
Fig. 20(viii)

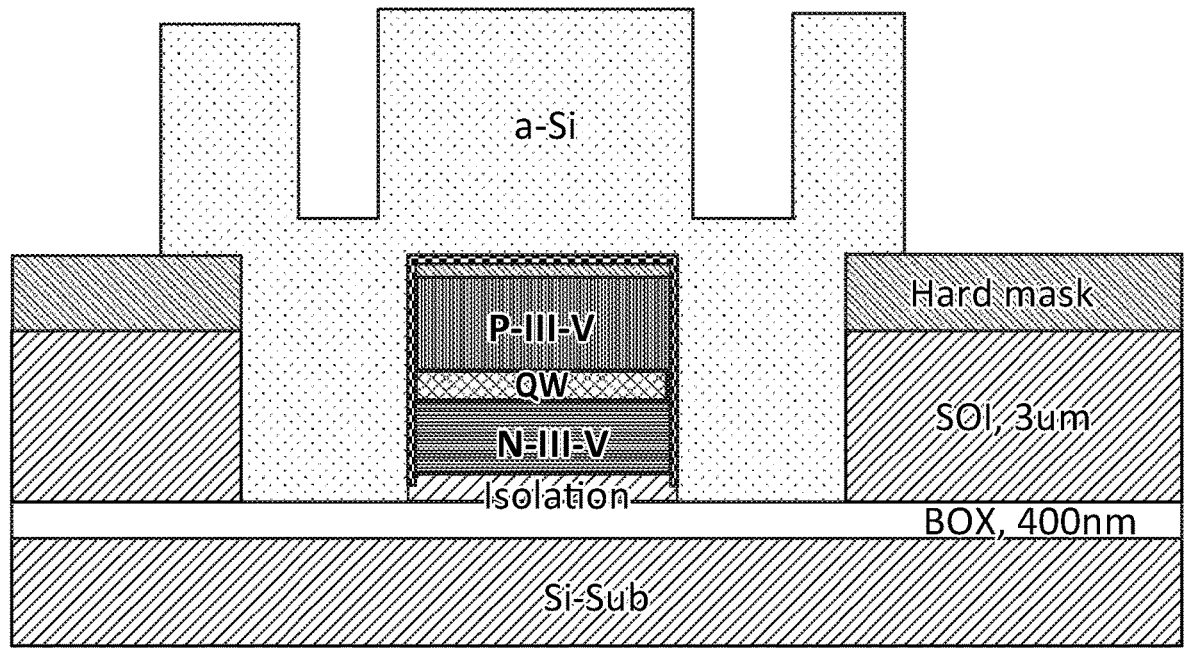
Fig. 26(iii)

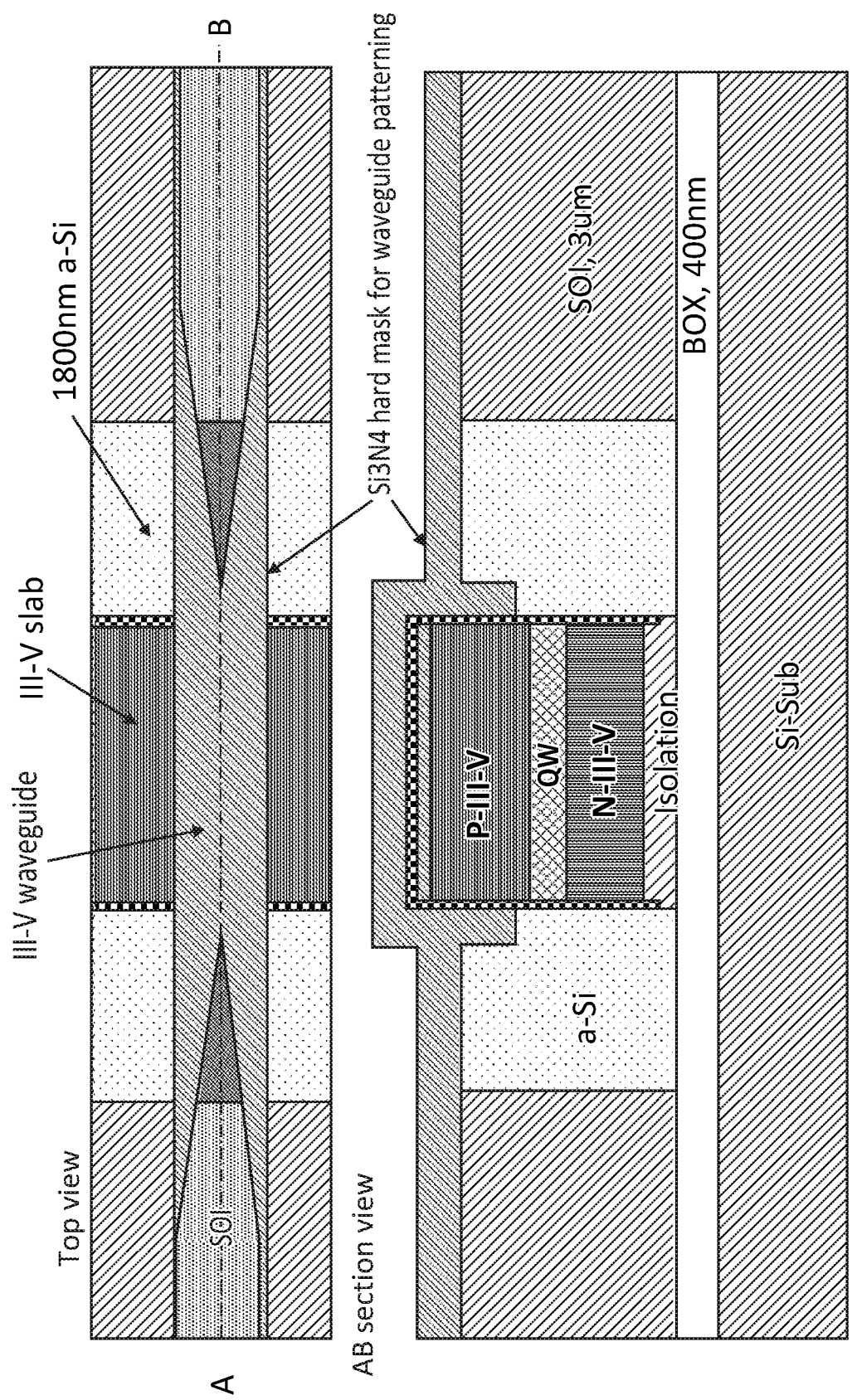
Fig. 26(vii)

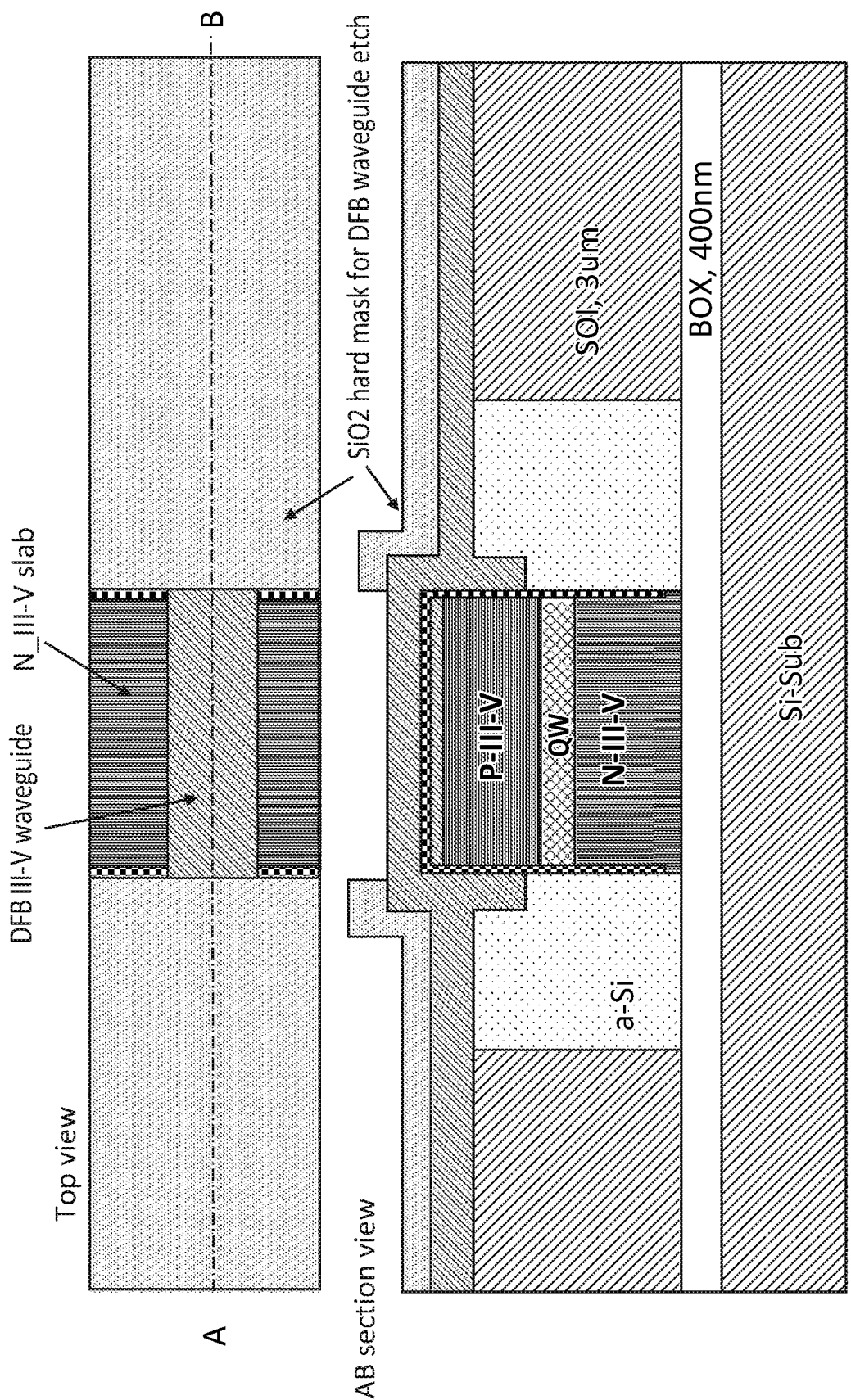
Fig. 26(viii)

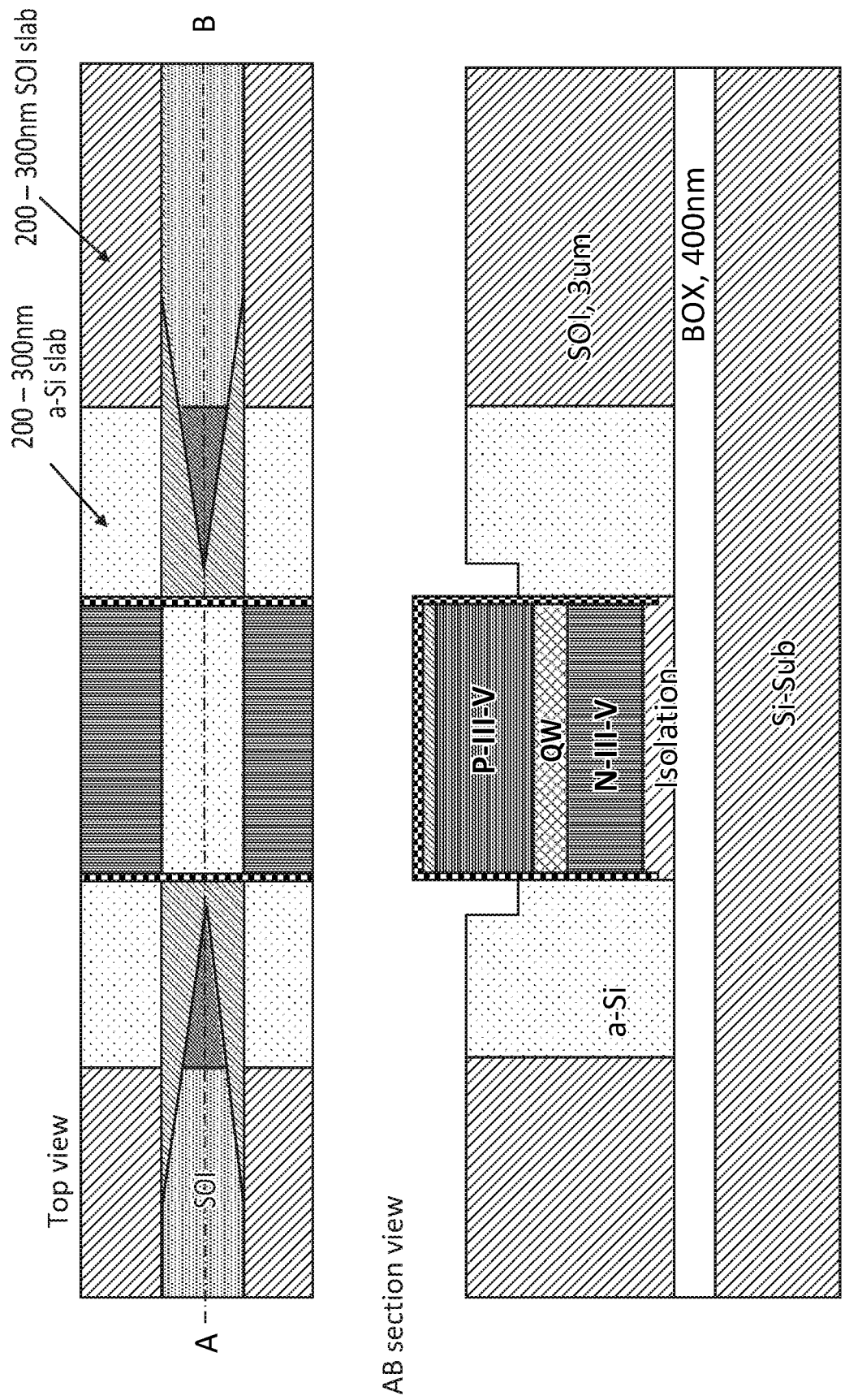

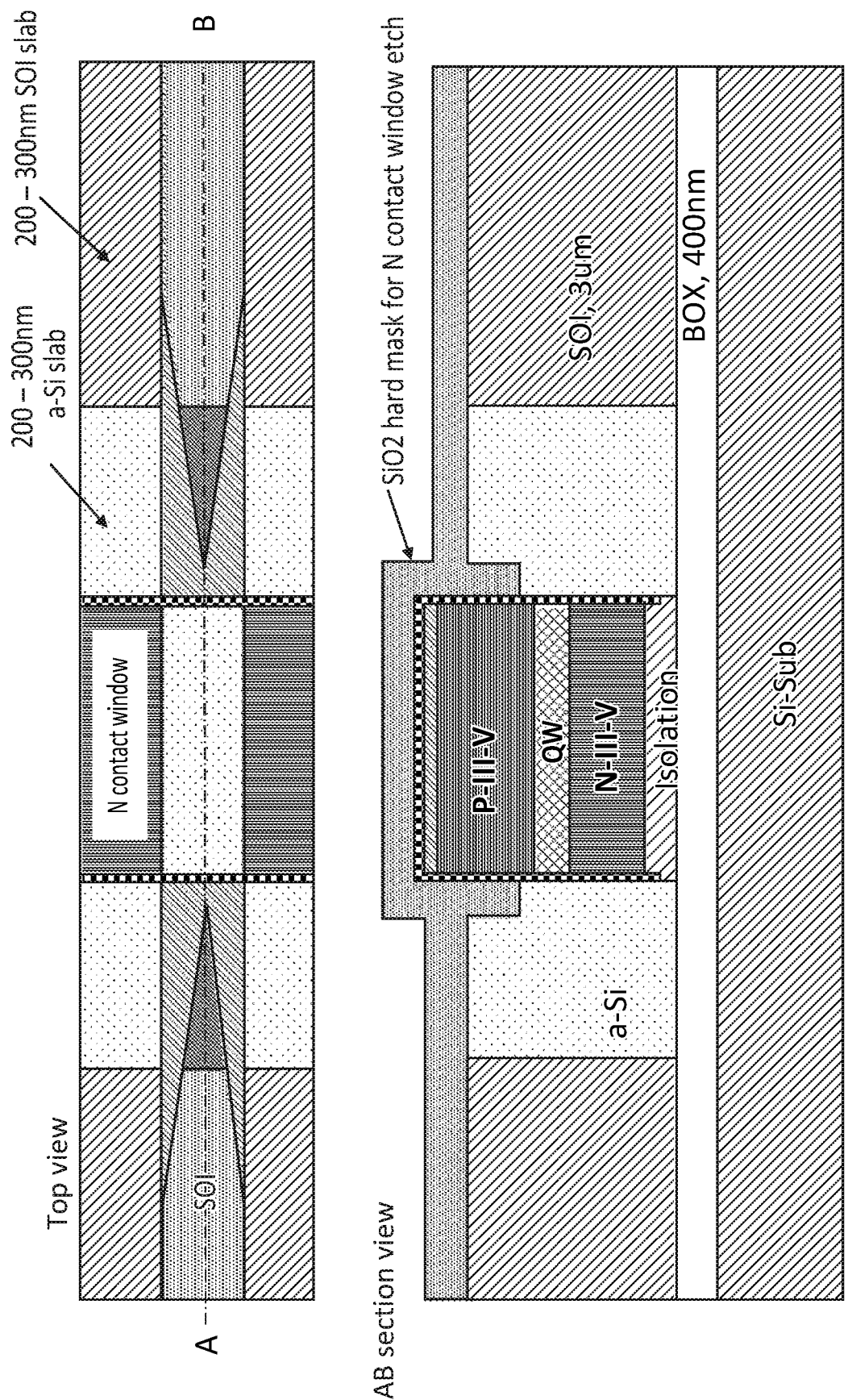
Fig. 26(xii)

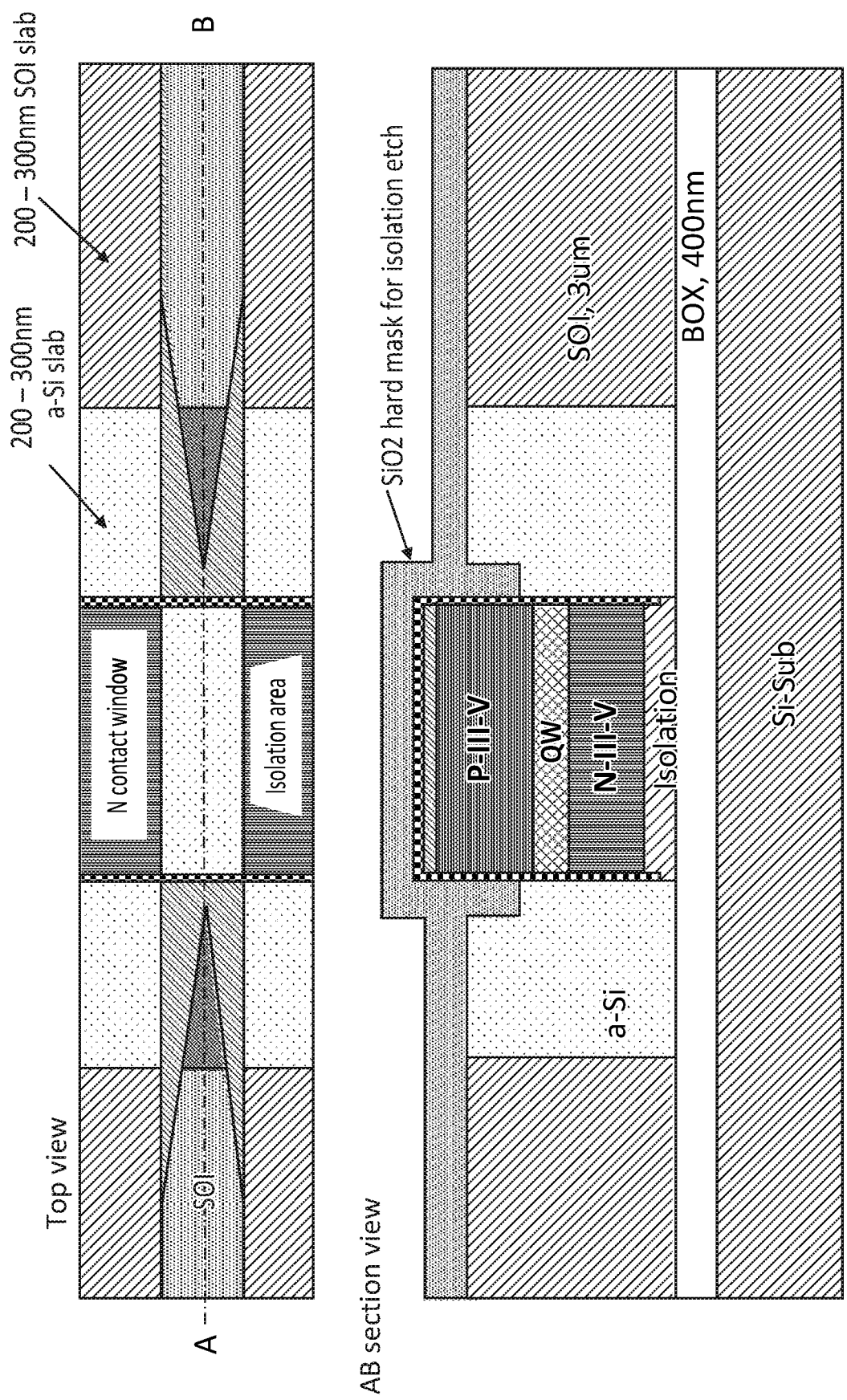
Fig. 26(xiii)

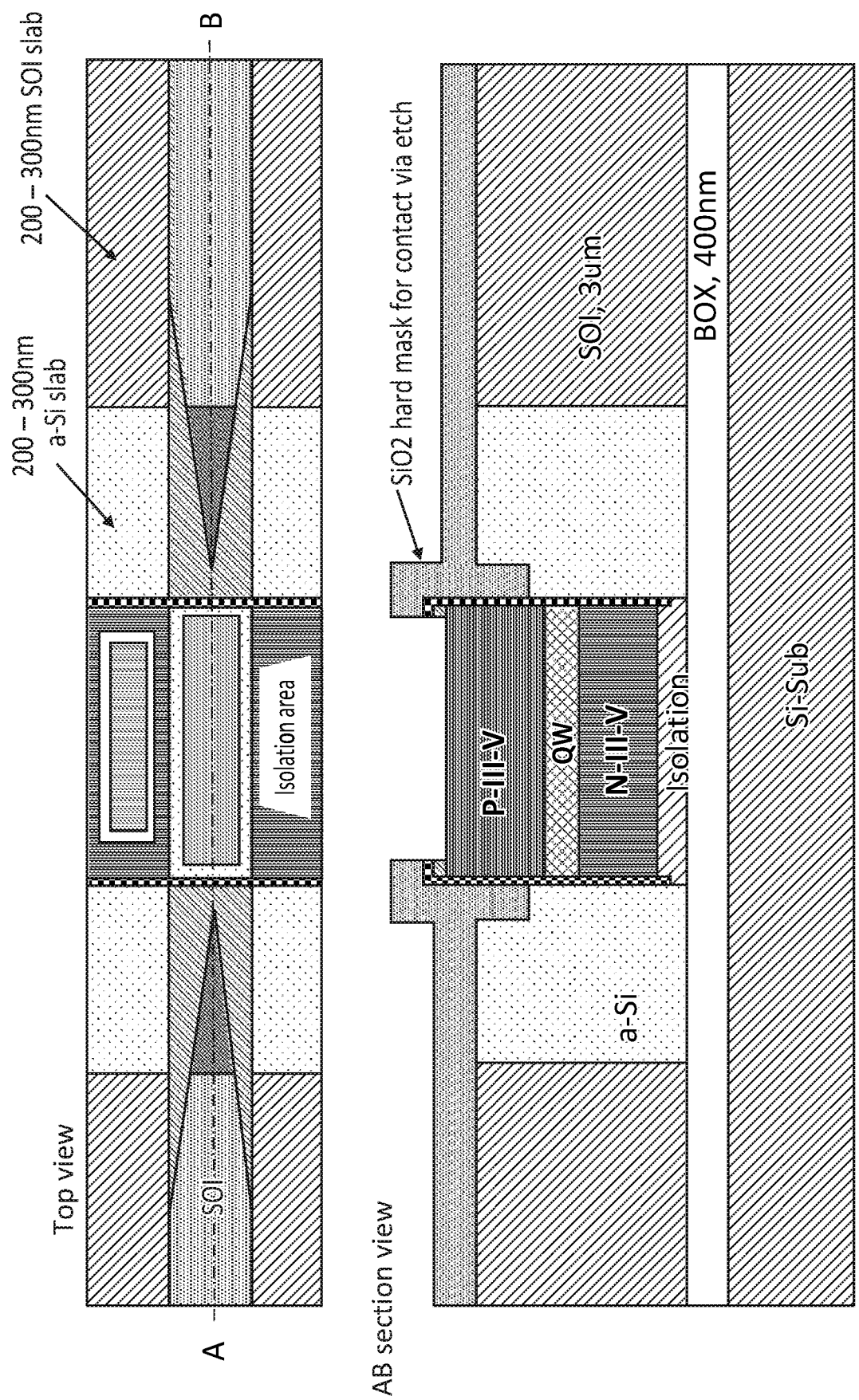
Fig. 26(xiv)

OPTOELECTRONIC DEVICE

CROSS-REFERENCE TO RELATED APPLICATION(S)

The present application claims priority to and the benefit of U.S. Provisional Application No. 63/247,297, filed Sep. 22, 2021, entitled "COUPLING FOR EAM AND DFB LASER"; the entire contents of which are incorporated herein by reference.

FIELD OF THE INVENTION

The present invention relates to optoelectronic device and method of manufacturing an optoelectronic device.

BACKGROUND

Hybrid integration of III-V semiconductor based electro-optical devices (e.g., modulators), with silicon-on-insulator (SOI) platforms by chip bonding confers the advantage of combining the best parts of both material systems.

However, conventional chip bonding processes typically use flip-chip bonding in which the III-V semiconductor based device is upside down and bonded into a cavity on the SOI platform. Devices fabricated using these methods typically suffer from high optical coupling losses between a waveguide in the III-V semiconductor based device and a waveguide in the SOI. Further, the manufacturing has a low yield and typically low reliability because of difficulties in accurately controlling the alignment of the respective waveguides.

Micro-transfer printing (MTP) is therefore being considered as an alternative way to integrate III-V semiconductor based devices with SOI wafer. In these methods, the III-V semiconductor based device can be printed into a cavity on the SOI in the same orientation in which it was manufactured, and the alignment between the III-V semiconductor based waveguide and the SOI waveguide is predetermined in the vertical direction (Z-direction).

Once the III-V semiconductor based device has been printed, the gap that exists between the III-V semiconductor based waveguide and the SOI waveguide facets is filled with a filling material. For example, as proposed in WO 2021/094473, the gap between the III-V semiconductor based device and the silicon waveguide, having a thickness of around 1 μm, is filled with Benzocyclobutene. In the prior art, it was understood that the thickness of this filling material should be kept as small as possible so as to minimise the extent to which the light travels through it and experiences losses.

SUMMARY

However, the present inventors have come to the realisation that there should be a minimum depth of this filling material. This is due to their insights into the growth of the filling material, and specifically that 1) if the gap is too narrow defects (e.g. voids) form within the filling material; and 2) there is no optical confinement in the filling material in the lateral direction (perpendicular to the light propagation direction) which decrease the efficiency of optical coupling between the SOI waveguide and the III-V semiconductor based device.

Accordingly, in a first aspect, embodiments of the invention provide an optoelectronic device, the optoelectronic device including:

a silicon platform, including a silicon waveguide and a cavity, wherein a bed of the cavity is provided at least in part by a buried oxide layer;

a III-V semiconductor-based optoelectronic component, bonded to the bed of the cavity of the silicon platform; and a bridge-waveguide, located between the silicon waveguide and the III-V semiconductor-based optoelectronic component.

Optional features of the invention will now be set out. These are applicable singly or in any combination with any aspect of the invention.

The buried oxide layer may extend entirely beneath: the silicon waveguide; the III-V semiconductor-based optoelectronic component, and the bridge-waveguide, so as to separate them from a silicon substrate. In some examples, the buried oxide layer may extend entirely beneath: the III-V semiconductor-based optoelectronic component and the bridge-waveguide, so as to separate them from a silicon substrate. Advantageously, the fabrication process as a single etch can be performed do define the cavities.

The bridge-waveguide may have a thickness, as measured in a direction from the silicon waveguide to the III-V semiconductor-based optoelectronic component, of at least 10 μm. It has been ascertained by the inventors that this minimum thickness ensures that the bridge-waveguide can be formed substantially or entirely defect free.

The bridge-waveguide may comprise amorphous silicon. The bridge-waveguide may have a thickness of at least 11 μm, at least 12 μm, at least 13 μm, at least 14 μm, at least 15 μm, or at least 20 μm. The bridge-waveguide may have a thickness of no more than 20 μm, no more than 15 μm, no more than 14 μm, no more than 13 μm, no more than 12 μm, or no more than 11 μm. For example, the thickness of the bridge-waveguide may be in a range of from 10 μm to 20 μm. The bridge-waveguide may have a thickness of 10 μm or substantially 10 μm.

The III-V semiconductor-based optoelectronic component includes an antireflective coating located adjacent to the bridge-waveguide. The anti-reflective coating may include plural layers. The plural layers may be silicon based. They may include: a first silicon dioxide layer, a silicon nitride layer, and a second silicon dioxide layer, wherein the silicon nitride layer is interposed between the first silicon dioxide layer and the second silicon dioxide layer. The first and second silicon dioxide layers may have a thickness, measured in the same direction as the bridge-waveguide thickness of at least 90 nm and no more than 100 nm. The first silicon dioxide layer, which may be the one closest to the bridge-waveguide, may have a thickness of 90 nm. The second silicon dioxide layer, which may be the one furthest from the bridge-waveguide, may have a thickness of 100 nm. The silicon nitride layer may have a thickness of 140 nm.

The III-V semiconductor-based optoelectronic component may include an isolation layer, and the anti-reflective coating may extend from the isolation layer up a lateral facet of the III-V semiconductor-based optoelectronic component.

The III-V semiconductor-based optoelectronic component may include a T-bar interface between the III-V semiconductor-based optoelectronic component and the bridge-waveguide.

The bridge-waveguide may include a T-bar interface between the bridge-waveguide and the III-V semiconductor-based optoelectronic component.

The III-V semiconductor-based optoelectronic component may include a waveguide, which may be butt coupled to the bridge-waveguide. There may, or may not, be an antireflective coating between the bridge-waveguide and the waveguide of the III-V semiconductor-based optoelectronic component. The silicon waveguide may be butt coupled to the bridge-waveguide. There may, or may not, be an antireflective coating between the silicon waveguide and the bridge-waveguide.

An interface between the III-V semiconductor-based optoelectronic component and the bridge-waveguide is angled relative to a transmission direction of light through the bridge-waveguide. The angle is greater than 0. The angle may be less than 20°. The angle may be, for example, 10°.

The bridge-waveguide may include a tapered region, tapering form a first width proximal to the III-V semiconductor-based optoelectronic component to a second width proximal to the silicon waveguide, wherein the first width is smaller than the second width. The widths may be measured in a direction perpendicular to the guiding direction of the bridge-waveguide and/or silicon waveguide. The first width may have a value of equal to or less than 0.5 µm. The second width may have a value of at least 0.5 µm and/or no more than 2.6 µm.

The silicon waveguide may include a tapered region, tapering from a first width proximal to the bridge-waveguide to a second width distal to the bridge-waveguide, wherein the first width is smaller than the second width. The widths may be measured in a direction perpendicular to the guiding direction of the bridge-waveguide and/or silicon waveguide. The first width may have a value of at least 0.5 µm and/or less than 2.6 µm. The second width may have a value of 2.6 µm.

A lower cladding layer for each of the III-V semiconductor-based optoelectronic component, the bridge-waveguide, and the silicon waveguide may be provided by a shared insulator layer. The shared insulator layer may be the buried oxide layer. The height of the buried oxide layer may vary. That is, the height of the cavity may vary as a function of position within the cavity. By height, it may be meant a direction perpendicular to the guiding direction of the silicon waveguide, e.g. it may be a direction connecting an uppermost portion of a sidewall of the cavity to the bed of the cavity. For example, the buried oxide layer may be thinner in a cavity of the optoelectronic device containing a DFB laser, in that the height of the buried oxide layer may be lower relative to surrounding portions of the buried oxide layer. In such an example, the cooling of the laser can be improved as there is less buried oxide to insulate it from the bulk device.

The bridge-waveguide and the silicon waveguide may each include a respective slab region and ridge region.

The III-V semiconductor based optoelectronic component may include a plurality of layers, and a bottommost layer which is adjacent to the bed of the cavity may have a height of no more than 0.3 µm.

In a second aspect, embodiments of the invention provide a method of manufacturing an optoelectronic device, including steps of:
bonding a III-V semiconductor-based optoelectronic component to a bed of a cavity, wherein the bed of the cavity is provided at least in part by a buried oxide layer, the cavity being located in a silicon platform, such that there is a space between the III-V semiconductor-based optoelectronic component and a sidewall of a cavity; and
filling the space between the III-V semiconductor-based optoelectronic component and the sidewall with a bridge-waveguide material.

The space between the III-V semiconductor-based optoelectronic component and the sidewall of the cavity may have a thickness, as measured in a direction from the sidewall to the III-V semiconductor-based optoelectronic component, of at least 10 µm.

The method may further include a step, after bonding the III-V semiconductor-based optoelectronic component, of performing one or more further processing steps on the III-V semiconductor-based optoelectronic component. The one or more further processing steps may include one or more of the following: a waveguide etch; an isolation etch; a via opening etc; and a metallisation step. The one or more further processing steps may include a waveguide patterning step, in which waveguides are simultaneously patterned in each of the III-V semiconductor-based optoelectronic component, the bridge-waveguide material, and the silicon platform. By simultaneously patterning these, the subsequently etched waveguides are self-aligned and so optical loss when coupling between them is reduced. The waveguides patterned in the bridge-waveguide material and the silicon platform may be etched simultaneously. Moreover, the bonding of the III-V semiconductor-based optoelectronic components can be done in a 'care-free' manner in at least one dimension (e.g. the x-direction, which is perpendicular to the guiding direction of the various waveguides).

The bridge-waveguide(s) can be provided or formed with an alignment error of +/−0.2 µm via stepper lithography. This can result in a coupling loss of around or less than 0.25 dB.

The III-V semiconductor-based optoelectronic component may include a plurality of III-V semiconductor layers. The III-V semiconductor-based optoelectronic component may include a waveguide. The III-V semiconductor-based optoelectronic component may be an electro-absorption modulator and may contain a multiple quantum well layer. The III-V semiconductor-based electro-absorption modulator may contain a waveguide which is straight, that is substantially uncurved. The III-V semiconductor-based optoelectronic component may be a laser, for example a distributed feedback laser and may contain a multiple quantum well layer and/or a grating layer.

The invention includes the combination of the aspects and preferred features described except where such a combination is clearly impermissible or expressly avoided.

The III-V semiconductor-based optoelectronic component may include one or more electrical traces making electrical contact on respectively portions of the III-V semiconductor-based optoelectronic component.

Further aspects of the present invention provide: a computer program comprising code which, when run on a computer, causes the computer to perform the method of the second aspect; a computer readable medium storing a computer program comprising code which, when run on a computer, causes the computer to perform the method of the second aspect; and a computer system programmed to perform the method of the second aspect.

BRIEF DESCRIPTION OF THE DRAWINGS

Embodiments of the invention will now be described by way of example with reference to the accompanying drawings in which:

FIG. 1 shows a top-down view of an optoelectronic device including both an EAM and a DFB laser;

FIGS. 2A-2H show, respectively, section views of the device of FIG. 1 along the lines A-H;

DETAILED DESCRIPTION AND FURTHER OPTIONAL FEATURES

Figure 2B:
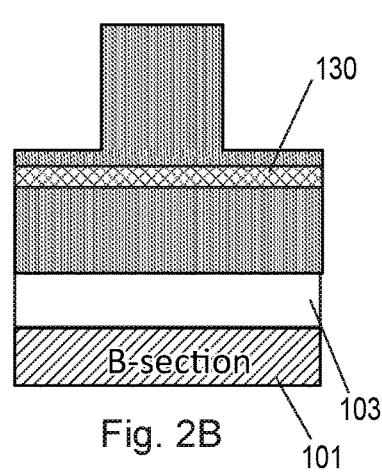
Figure 2C:
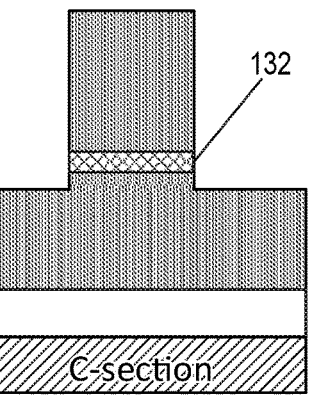
Figure 2D:
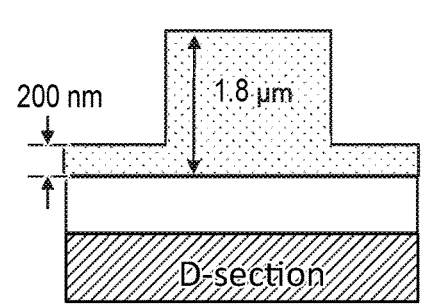
Figure 2E:
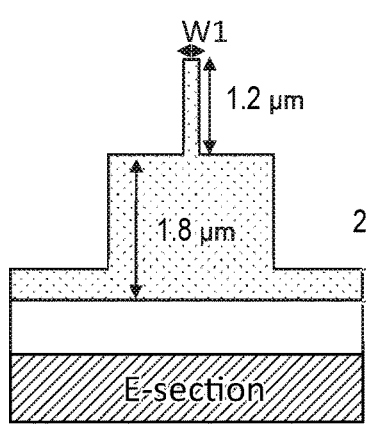

Aspects and embodiments of the present invention will now be discussed with reference to the accompanying figures. Further aspects and embodiments will be apparent to those skilled in the art. All documents mentioned in this text are incorporated herein by reference FIG. 1 shows a top-down view of an optoelectronic device 100 including both a distributed feedback (DFB) laser 102 and an electro-absorption modulator (EAM) 118 which are provided as discrete III-V semiconductor-based optoelectronic components integrated into a silicon platform which includes a silicon substrate 101 and buried oxide layer 103. FIGS. 2A-2H show, respectively, section views of the device of FIG. 1 along the lines A-H.

The DFB laser includes a III-V waveguide 104, which is coupled via an antireflective coating 120 to an α-Si waveguide. The α-Si waveguide is around 1.8 μm tall, as measured from a buried oxide layer beneath the waveguide to a point distalmost from the buried oxide layer and comprises a slab region 108 and ridge or rib region 106 above the slab. The ridge or rib region tapers in taper region 110 to increase in width in a direction away from the DFB laser. The slab portion 108 has a height of around 0.2 μm, and so the ridge or ridge is around 1.6 μm tall.

The α-Si waveguide is coupled to a silicon waveguide 112, with a tapered region 114 at either end. The taper regions of 110 and 114 form a taper that completes the optical mode transition from the 1.8 μm α-Si waveguide 106 to the silicon waveguide 112. The silicon waveguide 112 is around 3.0 μm tall, and carries light generated by the DFB on to the EAM 118. This coupling is via a second α-Si waveguide located between the silicon waveguide 112 and the EAM 118. As with the first α-Si waveguide, the second contains a tapered upper ridge or rib which is atop a slab. An end of the second α-Si waveguide adjacent to a first (input) facet of the EAM is provided with antireflective coating 120. The EAM includes quantum well layer 132 as shown in FIG. 2A cross-section. The second (output) facet of the EAM is also provided with an antireflective coating, and couples light into a third α-Si waveguide having the same structure as the first. Finally, light is coupled into a second silicon waveguide 128. The second silicon waveguide, in this example, is around 3 μm tall (as measured from the buried oxide layer to the uppermost surface, as shown in FIG. 2A) with a 1.8 μm slab portion 124 on top of a 0.2 μm slab portion 126.

Figure 2F:
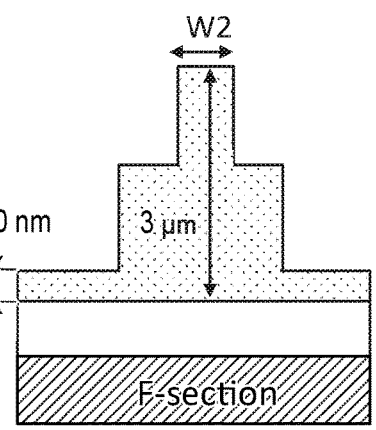
Figure 2G:
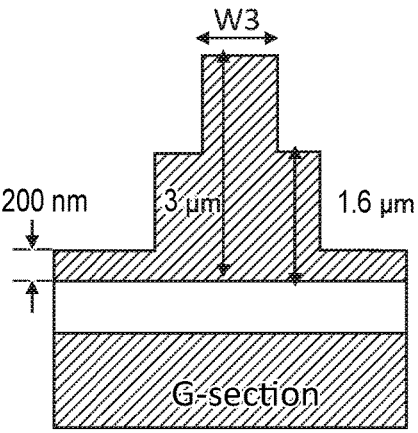
Figure 2H:
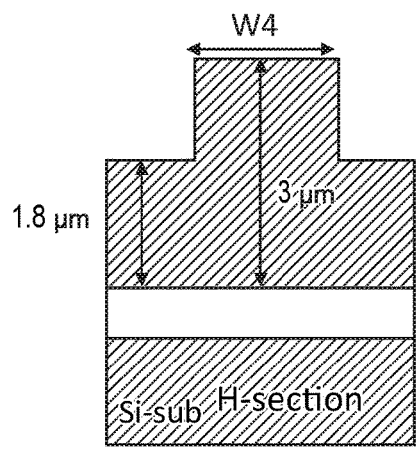

As shown in FIG. 2B, the quantum well layer 130 in DFB 102 extends through the slab portion of the III-V waveguide. Whereas, in contrast, the quantum well layer 132 in the EAM 118 is present only in the rib or ridge portion of the waveguide. The section view in FIG. 2D, along the line D in FIG. 1, shows that a portion of the α-Si waveguide nearest to the EAM (in this example, but equally nearest to the DFB if the first α-Si is considered) has a rib or ridge region having a height from the buried oxide layer of around 1.8 μm. Next, shown in FIG. 2E, a taper begins with a height of 1.2 μm and a width W1, which is less than or equal to 0.5 μm. The total height of slab, rib or ridge, and taper, is around 3 μm. The taper increases in width, as shown in FIG. 2F, to width W2, which has a value of at least 0.5 μm and no more than 2.6 μm. The light is then coupled into the silicon waveguide, which has its own taper from width W3, between 0.5 μm and 2.6 μm to width W4, which is 2.6 μm. The taper ceases as shown in FIG. 2H, where the rib or ridge has width W4, where W1<W2<W3<W4.

In one example, the total coupling loss from laser to SOI to EAM to SOI waveguide was 0.53+0.8+0.8+3*0.003+3*0.1(taper)=2.44dB. The DFB/α-Si waveguide mode coupling loss is 0.53 dB, the mode coupling loss between each α-Si/EAM waveguides is 0.8dB, the coupling loss of the antireflective coating 120 between each III-V optoelectronic component waveguide facet and each α-Si waveguide facet is 0.003 dB; and the optical losses in the tapered waveguide(s) is 0.1 dB.

An example EPI structure for the DFB laser is shown in Table 1 below, and an example EPI structure for the EAM is shown in Table 2 below. The same epitaxial structures may be kept with a reduced height of the InP bottom cladding layer to maximise the mode alignment efficiency.

TABLE 1

| | Lyr | Type | Material | Rpt | Mole Fraction Val | Mole Fraction Tol | Mole Fraction Val | Mole Fraction Tol | Strain Val | Strain Unit |
|---|---|---|---|---|---|---|---|---|---|---|
| DFB Epi layer stack | 21 | P++ | InGaAs | | 0.533 | | | | | |
| | 20 | P+ | GaIn($x$)As($y$)P | | 0.714 | | 0.619 | | | |
| | 19 | P+ | InP | | | | | | | |
| | 18 | P | InP | | | | | | | |
| | 17 | P | InP | | | | | | | |
| | 16 | P | InP | | | | | | | |
| | 15 | P | GaIn($x$)As($y$)P | | 0.776 | | 0.479 | | −300 | ppm |
| | 14 | U/D | InP | | | | | | | |
| | 13 | U/D | [Al($x$)Ga]In($y$)As | | 0.960 | | 0.528 | | −300 | ppm |
| | 12 | U/D | [Al($x$)Ga]In($y$)As | | 0.720 to 0.960 | | 0.528 | | −301 | ppm |
| | 11 | U/D | [Al($x$)Ga]In($y$)As | | 0.581 | | 0.489 | | −3000 | ppm |
| | 10 | U/D | [Al($x$)Ga]In($y$)As | 4 | 0.640 | | 0.708 | | 9000 | ppm |
| | 9 | U/D | [Al($x$)Ga]In($y$)As | 4 | 0.581 | | 0.489 | | −3000 | ppm |
| | 8 | U/D | [Al($x$)Ga]In($y$)As | | 0.960 to 0.720 | | 0.528 | | −300 | ppm |
| | 7 | U/D | [Al($x$)Ga]In($y$)As | | 0.960 | | 0.528 | | −300 | ppm |
| | 6 | N | InP | | | | | | | |
| | 5 | N | InP | | | | | | | |
| Spacer | 4 | N | InP | | | | | | | |
| Interface layer: LM | 3 | N | InGaAs | | 0.533 | | | | | |
| Etch release layer | 2 | N | AlInAS | | 0.480 | | | | | |
| Buffer | 1 | N | InP | | | | | | | |
| | | | InP Substrate | | | | | | | |

| | Strain Tol | PL Val | PL Unit | PL Tol | Thickness Val | Thickness Unit | Thickness Tol | Dopant | Val | Unit |
|---|---|---|---|---|---|---|---|---|---|---|
| DFB Epi layer stack | | 1300 | nm | +/−50 | 0.0750 | μm | | Zn | =2.00e19 | cm−3 |
| | | | | | 0.0250 | μm | | Zn | =3.00e18 | cm−3 |
| | | | | | 1.0000 | μm | | Zn | 1.00E+18 | cm−3 |
| | | | | | 0.5300 | μm | | Zn | 6.00E+17 | cm−3 |
| | | | | | 0.0600 | μm | | Zn | 6.00E+17 | cm−3 |
| | | | | | 0.0100 | μm | | Zn | 1.00E+18 | cm−3 |
| | | 1200 | nm | +/−25 | 0.0170 | μm | | Zn | 1.00E+18 | cm−3 |
| | | | | | 0.1500 | μm | | Zn | 6.00E+17 | cm−3 |
| | | | | | 0.0100 | μm | | Zn | 6.00E+17 | cm−3 |
| | | | | | 0.0100 | μm | | Zn | 3.00E+17 | cm−3 |
| | | 1000 | nm | +/−15 | 0.0090 | μm | | UD | | |
| | | 1290 | nm | +/−5 | 0.0060 | μm | +/−5% | UD | | |
| | | 1000 | nm | +/−15 | 0.0090 | μm | | UD | | |
| | | | | | 0.0100 | μm | | Si | 6.00E+17 | cm−3 |
| | | | | | 0.0100 | μm | | Si | 1.00E+18 | cm−3 |
| | | | | | 0.3000 | μm | | Si | 1.00E+18 | cm−3 |
| | | | | | 0.3000 | μm | | Si | 1.50E+18 | cm−3 |
| Spacer | | | | | 0.2420 | μm | | Si | 5.00E+18 | cm−3 |
| Interface layer: LM | | | | | 0.0500 | μm | | Si | 5.00E+18 | cm−3 |
| Etch release layer | | | | | 0.5000 | μm | | Si | 5.00E+18 | cm−3 |
| Buffer | | | | | 0.0500 | μm | | Si | 5.00E+18 | cm−3 |
| | | | | | InP Substrate | | | | | |

TABLE 2

| Layer | Mutlpl. | Material | Composition | Band gap in Wavelength (nm) | Thickness (nm) | Width in FDTD (um) | Index | Doping |
|---|---|---|---|---|---|---|---|---|
| 19 | | InGaAs | LM | | 120 + 30 | 2.5 | 3.593 | 1e19 CBr + Zn |
| 18 | | InGaAsP | | 1100 | 50 | 2.5 | 3.332 | 1.5e18 Zn |
| 17 | | InP | — | — | 1340 | 2.5 | 3.205 | 1e18 Zn |
| 16 | | InGaAsP | | 1100 | 20 | 2.5 | 3.332 | 1e18 Zn |
| 15 | | AlInAs | | | 60 | 2.5 | 3.233 | 1e17 to 1e18 |
| 14 | | AlInAs | | 843 | 60 | 2.5 | 3.233 | 1e17 Zn |
| 13 | | AlInGaAs | | 968 | 70 | 2.5 | 3.309 | |
| 12 | 12× | AlInGaAs | | 1127 | 7 | 2.5 | 3.407 | |
| 11 | 12× | AlInGaAs | | 1243 | 9 | 2.5 | 3.511 | |
| 10 | | AlInGaAs | | 1127 | 7 | 2.5 | 3.407 | |

TABLE 2-continued

| Layer | Mutlpl. | Material | Composition | Band gap in Wavelength (nm) | Thickness (nm) | Width in FDTD (um) | Index | Doping |
|---|---|---|---|---|---|---|---|---|
| 9 | | InGaAsP | | 1100 | 117 | 2.5 | 3.332 | |
| 8 | | InP | — | — | 80 | 2.5 | 3.205 | 2e17 Si |
| 7 | | InP | — | — | 70 | 2.5 | 3.205 | 5e17 Si |
| 6 | | InP | — | — | 310 | 16 | 3.205 | 8e17 Si |
| 5 | | InGaAsP | | | 20 | | | Undoped |
| 4 | | InP | | | 200 | | | undoped |
| 3 | | InGaAs | | | 50 | | | 5e18 |
| 2 | | AlInAs | | | 500 | | | 5e18 |
| 1 | | InP | | | 50 | | | 5e18 |
| 0 | | | | Si substrate | | | | |

Figure 3:
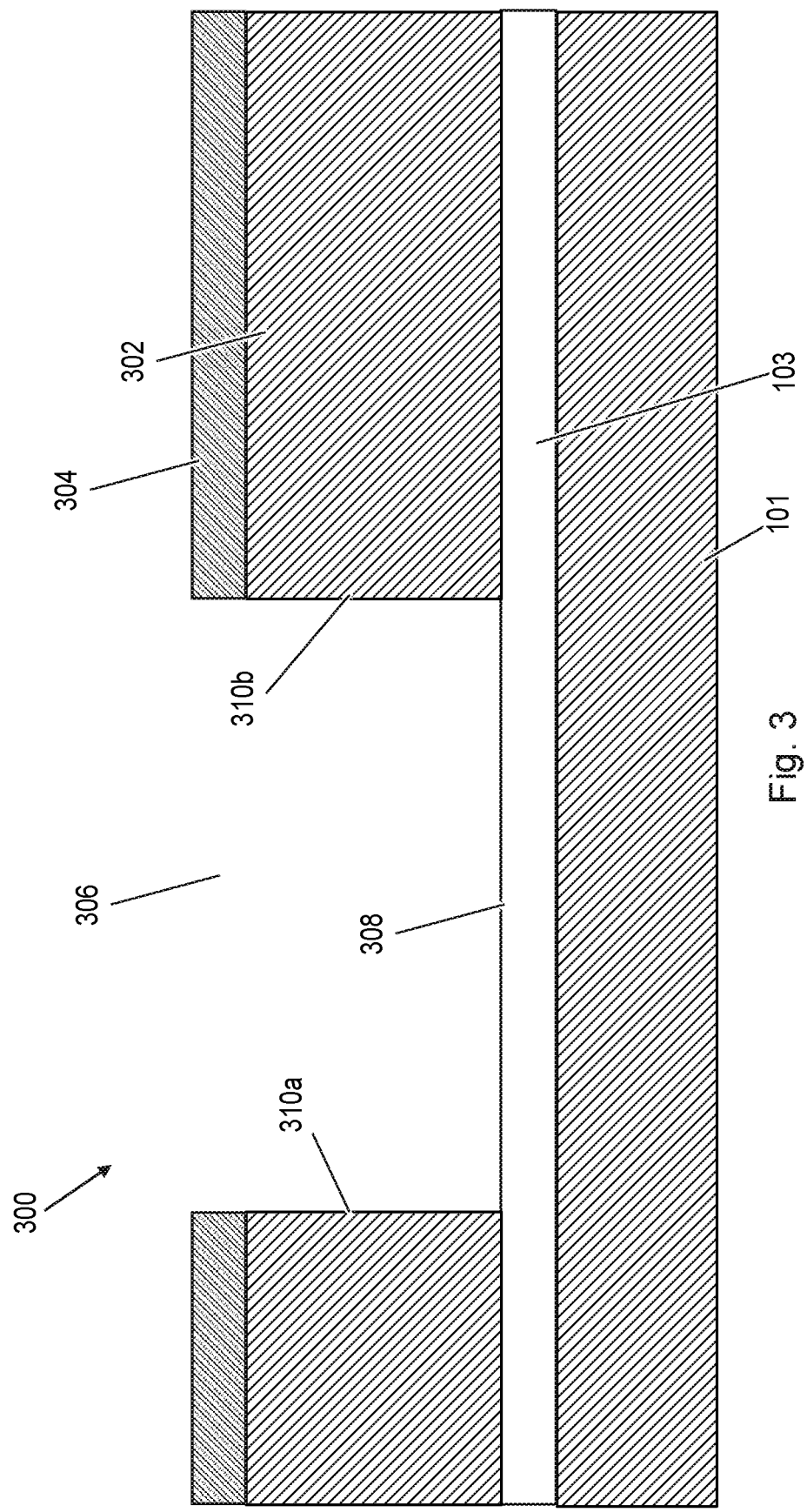
FIG. 3 shows a silicon platform before the III-V semiconductor-based optoelectronic component has been bonded to the bed of the cavity.

FIG. 3 shows a silicon platform 300 before the III-V semiconductor-based optoelectronic component(s) have been provided. The silicon platform includes the silicon substrate 101 referred to previously, atop of which is an insulator layer 103 (in this example a buried oxide layer). A silicon device layer 302, also referred to a silicon-on-insulator layer, is present atop of the insulator layer. The insulator layer in this example has a height (as measured from the substrate to the device layer) of 400 nm. Atop of the silicon device layer 302 is a hard mask (in this example formed of silicon dioxide). The silicon device layer has a height, as measured from the insulator layer to the hard mask, of 3 μm. A portion of the silicon device layer is removed to form cavity 306, the cavity having a bed 308 and sidewalls 310a and 310b. In some examples the cavity is substantially square, and so two further sidewalls are present (not visible in this section view). In this example, there is no antireflective coating on the sidewalls. However, in other examples, an ARC coating can be provided over the sidewalls.

Figure 4:
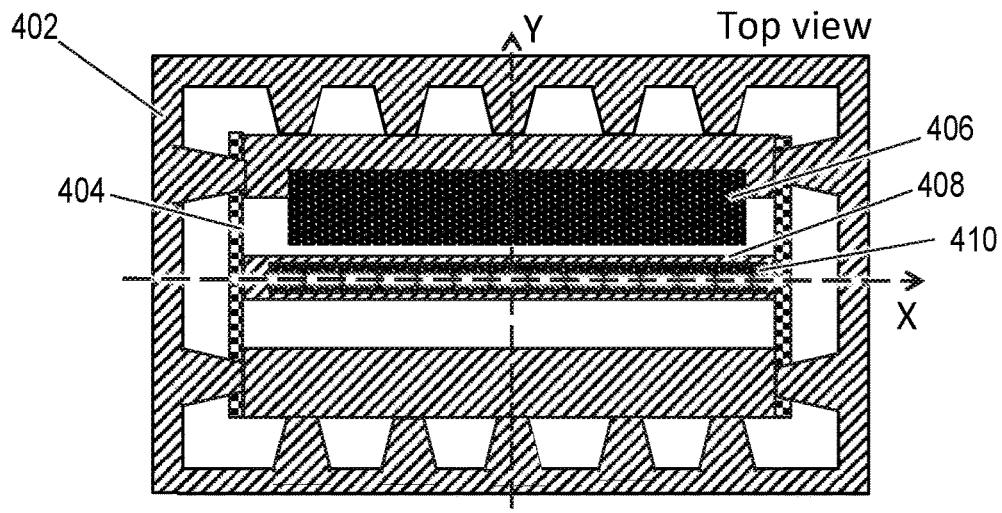
FIG. 4 shows a top-down view of an EAM device coupon for use with the silicon platform of FIG. 3.
Figure 5A:
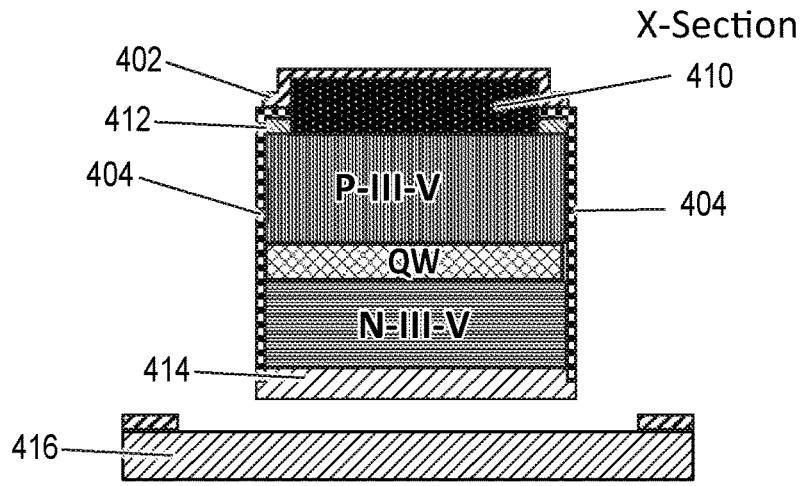
FIGS. 5A and 5B show, respectively, section views of the device coupon of FIG. 4 along the lines X and Y.
Figure 5B:
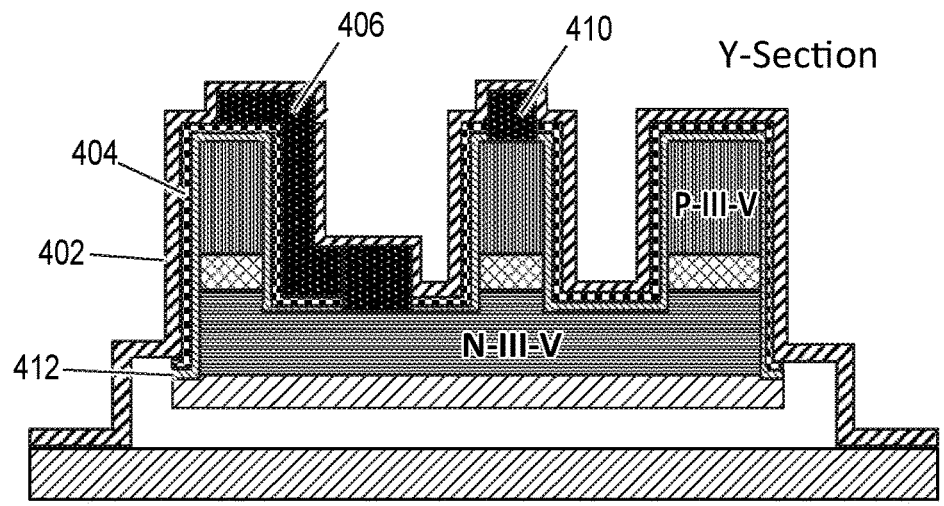

FIG. 4 shows a top-down view of an EAM device coupon for use with the silicon platform of FIG. 3. FIGS. 5A and 5B show, respectively, section views of the device coupon of FIG. 4 along the lines X and Y. The coupon in this example is finished, in that no further processing is required to the device coupon for the EAM device to function. As can be seen, the coupon is attached via dielectric tether to a III-V semiconductor (in this example, InP) substrate 416. A release layer previously located between the coupon and the substrate has been removed, for example via a wet etch.

In an upper region of the device coupon is n-electrode 406 and p-electrode 410. The p-electrode sits atop waveguide 408. The dielectric tether 402 does extend over these electrodes, however for the sake of clarity the electrodes are shown in the top-down view of FIG. 4. As visible in FIGS. 5A and 5B, a dielectric 412 layer is used to isolate the EAM from the metal electrodes asides from dedicated vias therethrough. The p-electrode contacts an upper p-doped layer, P-III-V, of the device, whereas the n-electrode contacts a lower n-doped layer, N-III-V. Shown most clearly in FIG. 5B, the n-electrode extends from an upper surface of the device coupon down towards the InP substrate so as to contact the lower n-doped layer. The n-electrode and p-electrode have a same height on the upper surface of the device coupon. The device also includes an isolation layer 414 which is the lowermost portion of the device coupon. Input and output facets of the device coupon are covered by antireflective coatings 404

Figure 6:
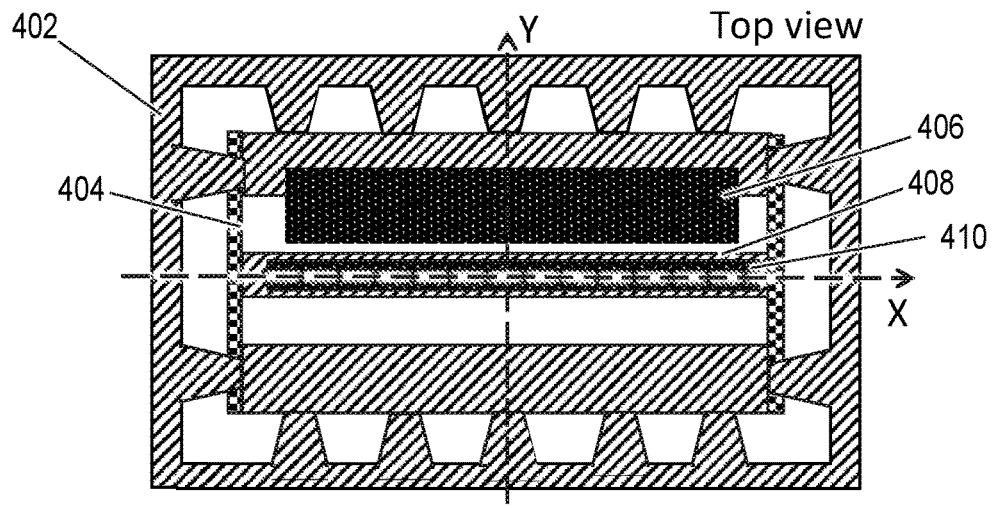
FIG. 6 shows a top-down view of a DFB laser device coupon for use with the silicon platform of FIG. 3.
Figure 7A:
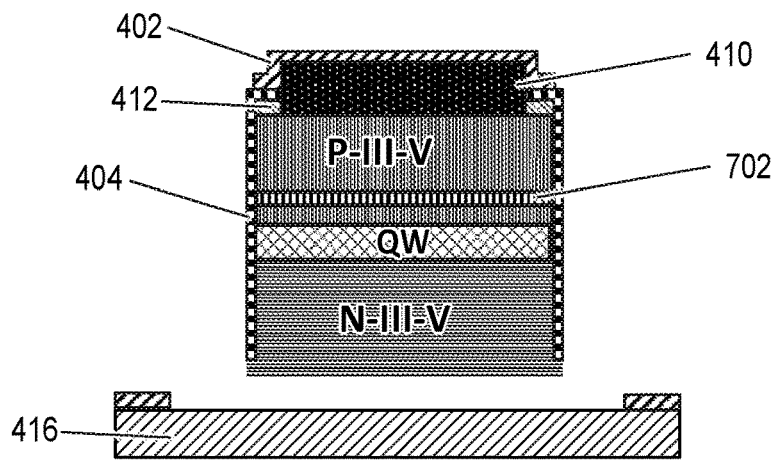
FIGS. 7A and 7B show, respectively, section views of the device coupon of FIG. 6 along the lines X and Y.
Figure 7B:
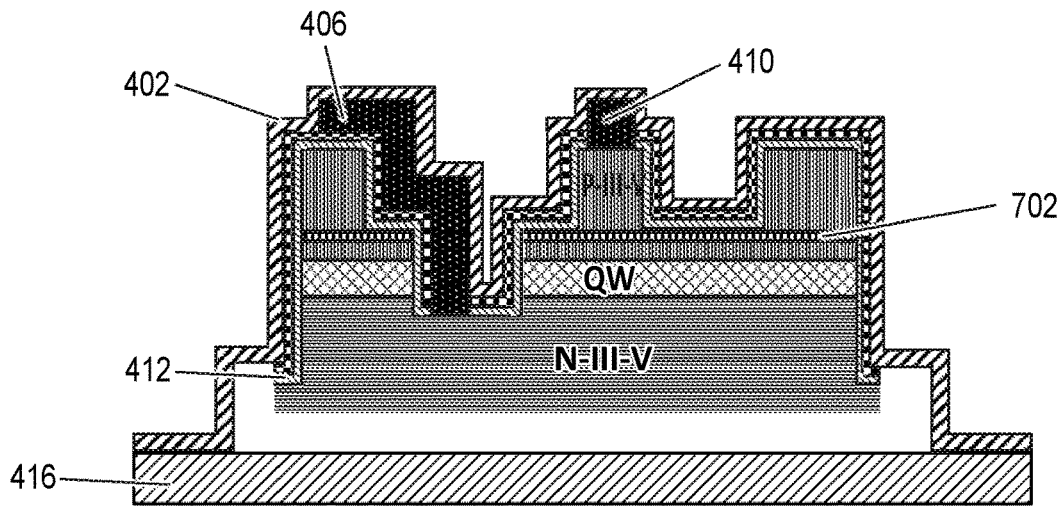

FIG. 6 shows a top-down view of a DFB laser device coupon for use with the silicon platform of FIG. 3. FIGS. 7A and 7B show, respectively, section views of the device coupon of FIG. 6 along the lines X and Y. Where it shares features with the EAM device coupon of FIG. 4, like features are indicated by like reference numerals.

In contrast to the EAM device coupon on FIG. 4, the DFB laser device coupon does not include an isolation layer. It does include a grating layer 702, located within the upper p-doped III-V layer and spaced from the quantum well layer.

Figure 8:
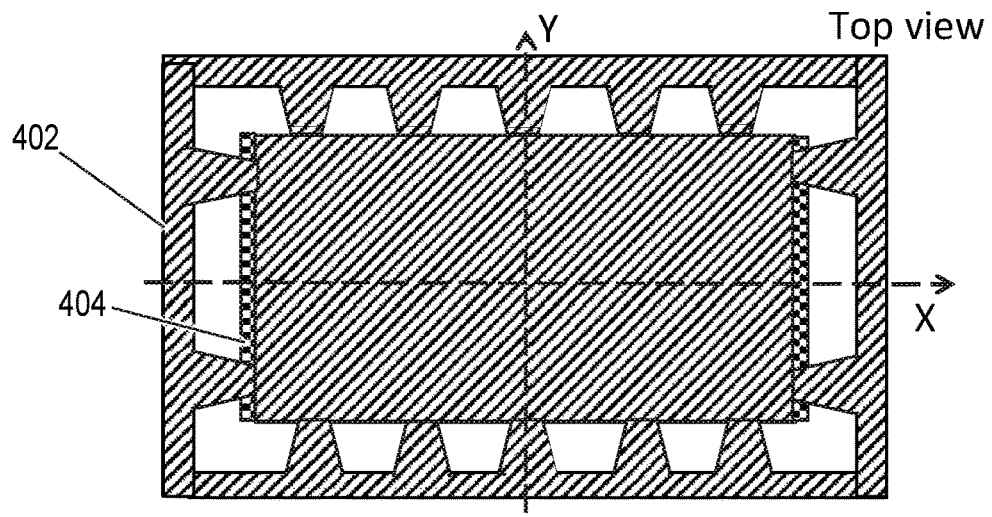
FIG. 8 shows a top-down view of a variant EAM device coupon for use with the silicon platform of FIG. 3.
Figure 9A:
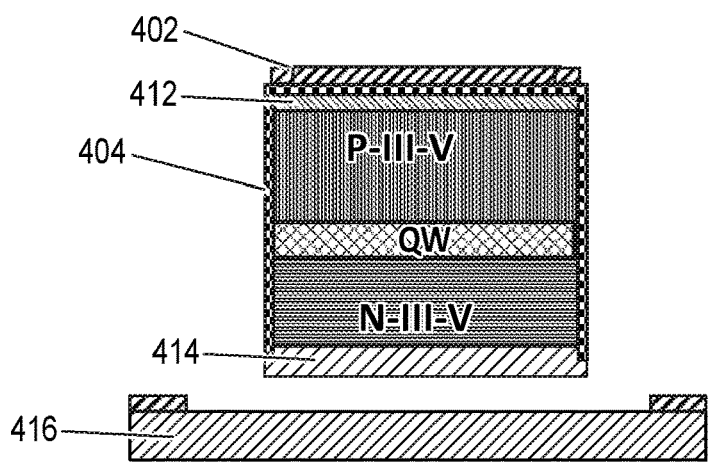
FIGS. 9A and 9B show, respectively, section views of the device coupon of FIG. 8 along the lines X and Y.
Figure 9B:
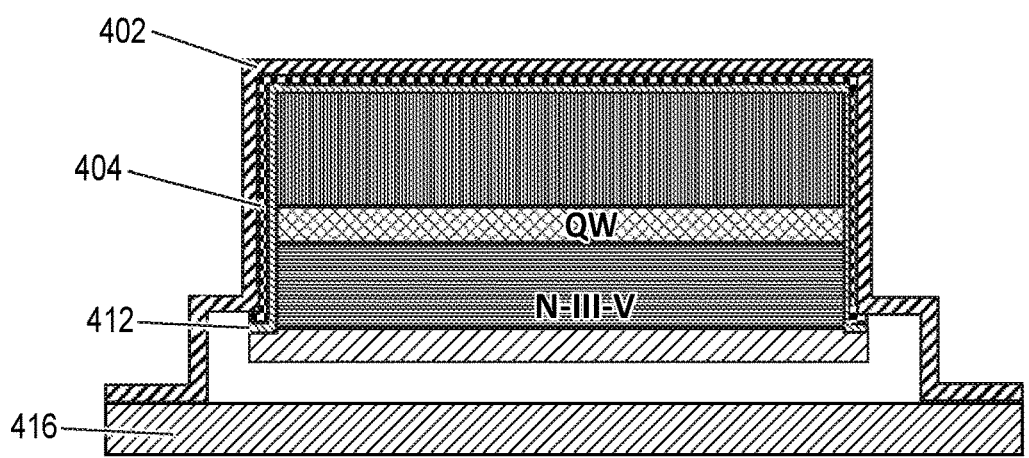

FIG. 8 shows a top-down view of a variant EAM device coupon for use with the silicon platform of FIG. 3. FIGS. 9A and 9B show, respectively, section views of the device coupon of FIG. 8 along the lines X and Y. In contrast to the device coupon in FIG. 4, this device coupon is unfinished. Once printed, subsequent processing is required before it can be used. Specifically, no waveguides have been etched, and no metallisation process has been performed to provide electrodes. Instead, the device coupon is merely a multi-layered stack with: a dielectric layer; a p-doped layer, P-III-V; a quantum well layer; an n-doped layer, N-III-V; and an isolation layer 414. Once the device coupon has been bonded to the silicon platform (e.g. as shown in FIG. 3), waveguides are etched into the plurality of layers, and electrodes are provided in contact with the various doped layers.

Figure 10:
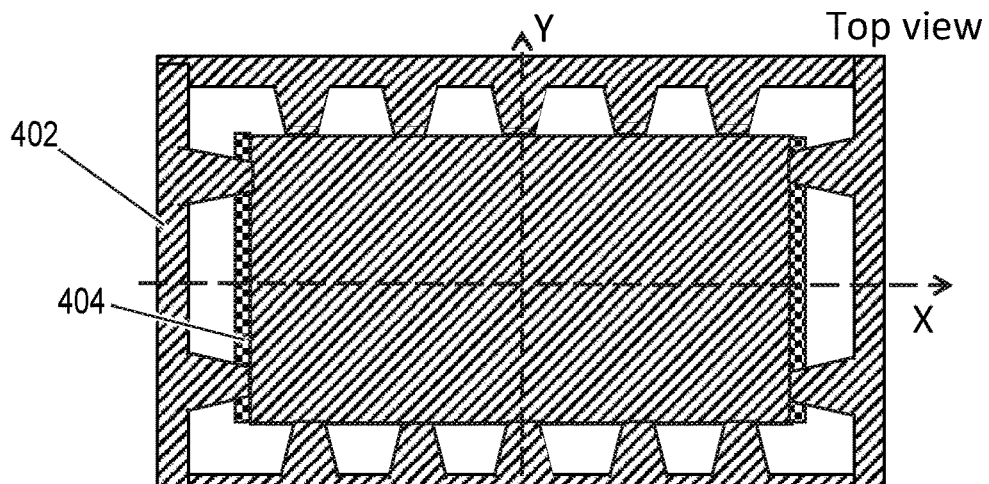
FIG. 10 shows a top-down view of a variant DFB laser device coupon for use with the silicon platform of FIG. 3.
Figure 11A:
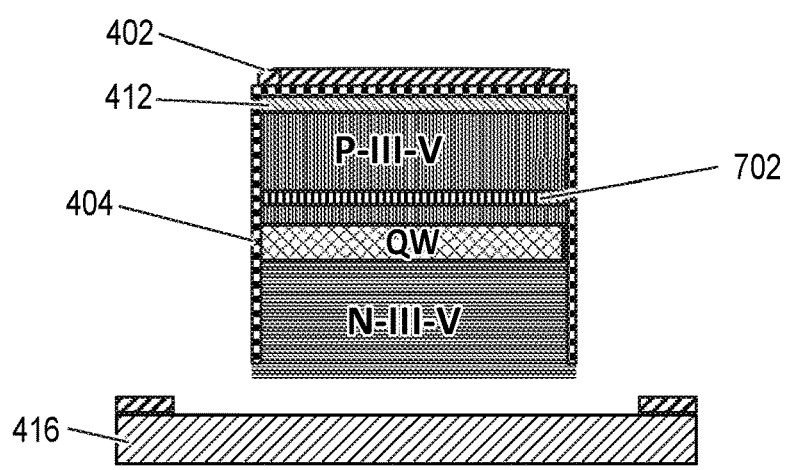
FIGS. 11A and 11B show, respectively, section views of the device coupon of FIG. 10 along the lines X and Y.
Figure 11B:
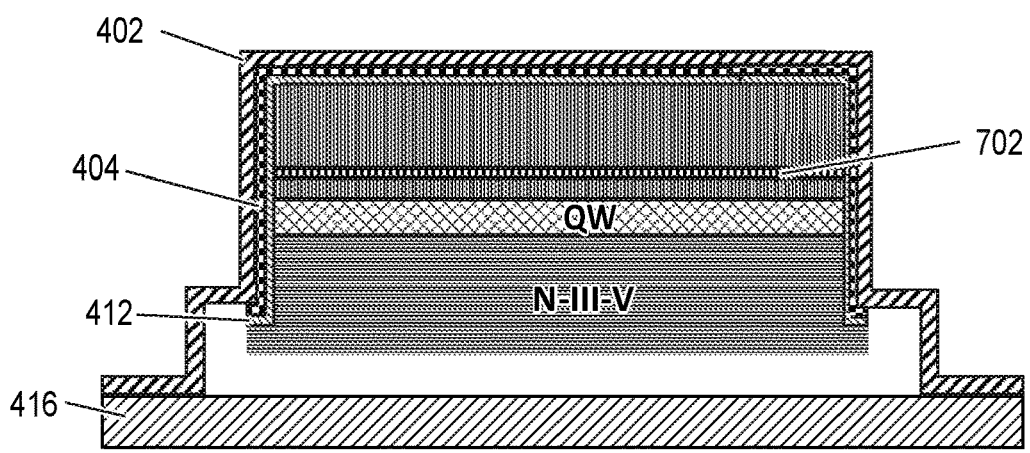

FIG. 10 shows a top-down view of a variant DFB laser device coupon for use with the silicon platform of FIG. 3. FIGS. 11A and 11B show, respectively, section views of the device coupon of FIG. 10 along the lines X and Y. Where it shares features with the unfinished DFB laser device coupon of FIG. 6, like features are indicated by like reference numerals. In contrast to the device coupon in FIG. 6, this device coupon is unfinished. Once printed, subsequent processing is required before it can be used. Specifically, no waveguides have been etched, and no metallisation process has been performed to provide electrodes. Instead, the device coupon is merely a multi-layered stack with: a dielectric layer; a p-doped layer, P-III-V; grating layer 702; a quantum well layer; and an n-doped layer, N-III-V. Once the device coupon has been bonded to the silicon platform (e.g. as shown in FIG. 6), waveguides are etched into the plurality of layers, and electrodes are provided in contact with the various doped layers.

Figure 12:
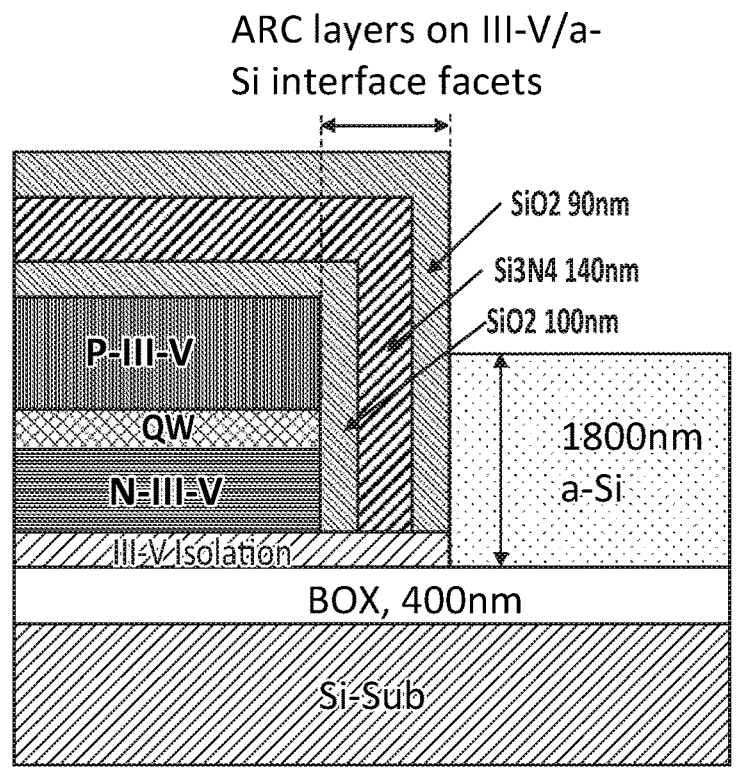
FIG. 12 shows the structure of a EAM/α-Si waveguide interface.

FIG. 12 shows the structure of a EAM/α-Si waveguide interface in the finished optoelectronic device (e.g. after the MTP process has been performed) in more detail. The anti-reflective coating present on the facet of the EAM III-V device coupon is multi-layered in this example, and comprises: an inner silicon dioxide layer (in this example 100 nm in thickness); an intermediate silicon nitride layer (in this example formed of $Si_3N_4$ and having a thickness of 140 nm); and an outer silicon dioxide layer (in this example 90 nm in thickness). The α-Si had a refractive index of 3.42, and a height as measured from the buried oxide layer of around 1800 nm. As can be seen, the isolation layer extends underneath the anti-reflective coating, that is between the anti-reflective coating and the buried oxide layer on which the MTP has been bonded after printing.

Figure 13:
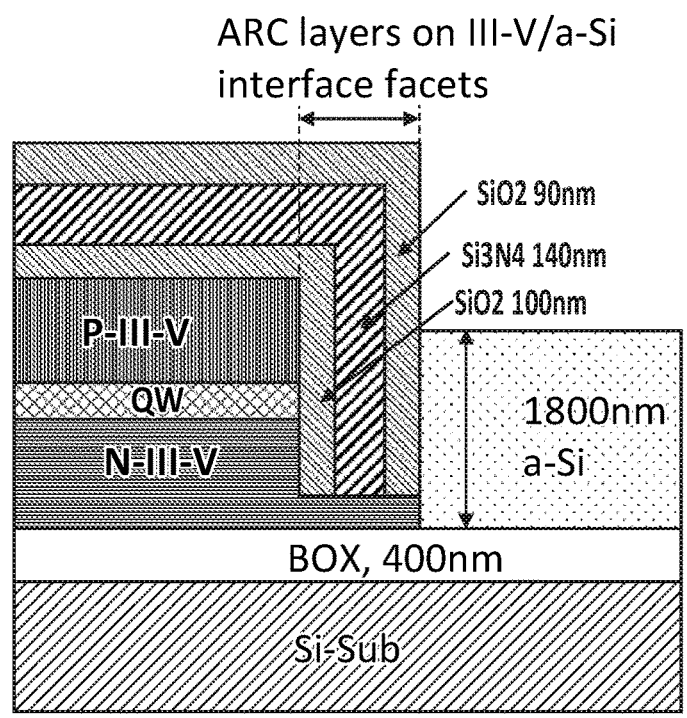
FIG. 13 shows the structure of a DFB laser/α-Si waveguide interface.

FIG. 13 shows the structure of a DFB laser/α-Si waveguide interface in the finished optoelectronic device (e.g. after the MTP process has been performed) in more detail. The anti-reflective coating present on the facet of the DFB III-V device coupon is multi-layered in this example, and comprises: an inner silicon dioxide layer (in this example 100 nm in thickness); an intermediate silicon nitride layer (in this example formed of $Si_3N_4$ and having a thickness of 140 nm); and an outer silicon dioxide layer (in this example 90 nm in thickness). The α-Si had a refractive index of 3.42, and a height as measured from the buried oxide layer of around 1800 nm. As can be seen, the lower n-doped layer extends underneath the anti-reflective coating, that is between the anti-reflective coating and the buried oxide layer on which the MTP has been bonded after printing.

Figure 14:
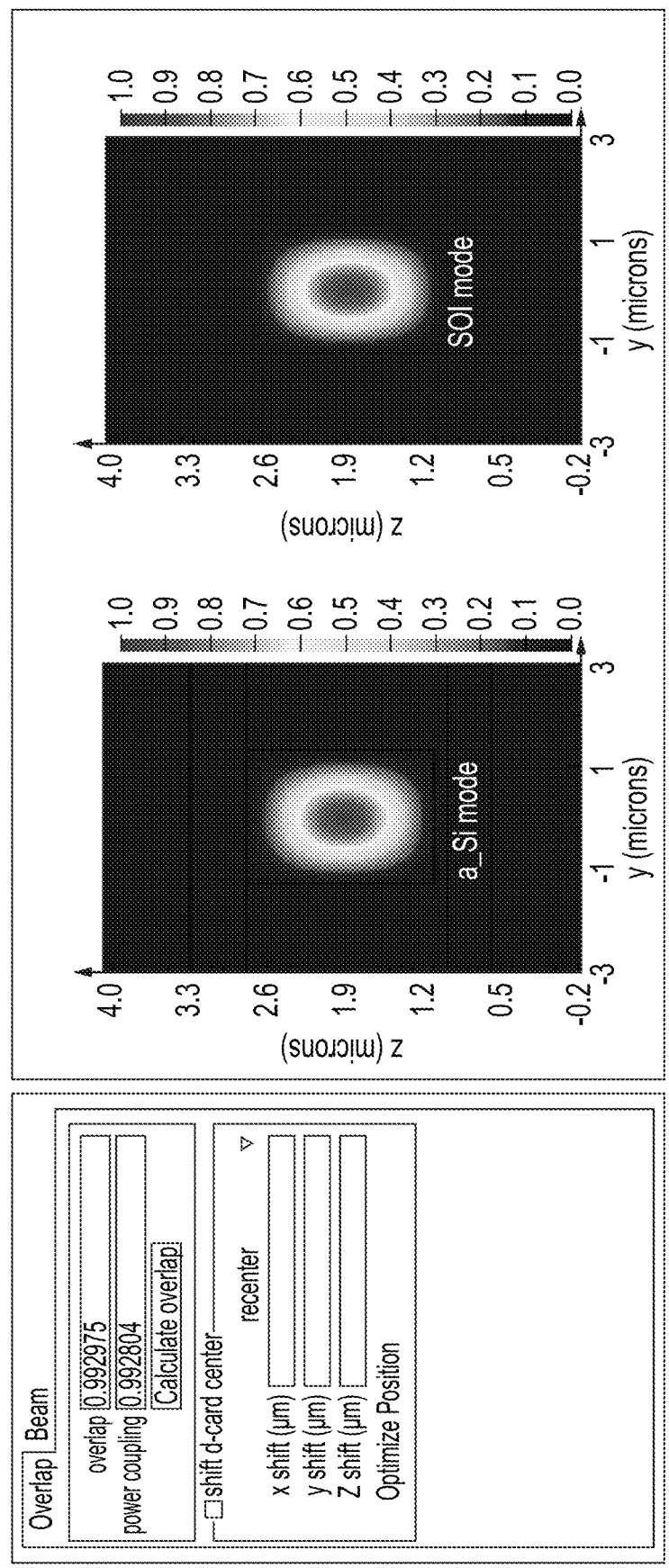
FIG. 14 shows simulated optical modes in various portions of the optoelectronic device of FIG. 1.
Figure 14:
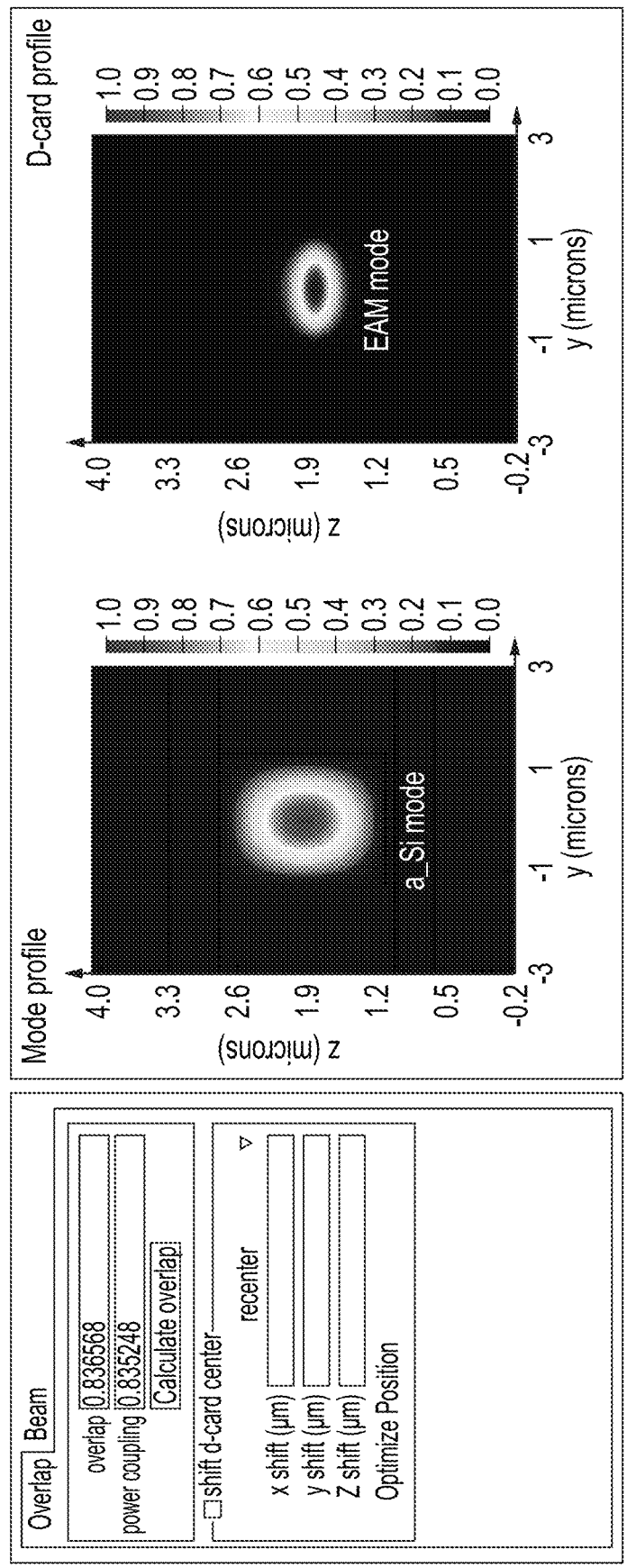
Figure 14:
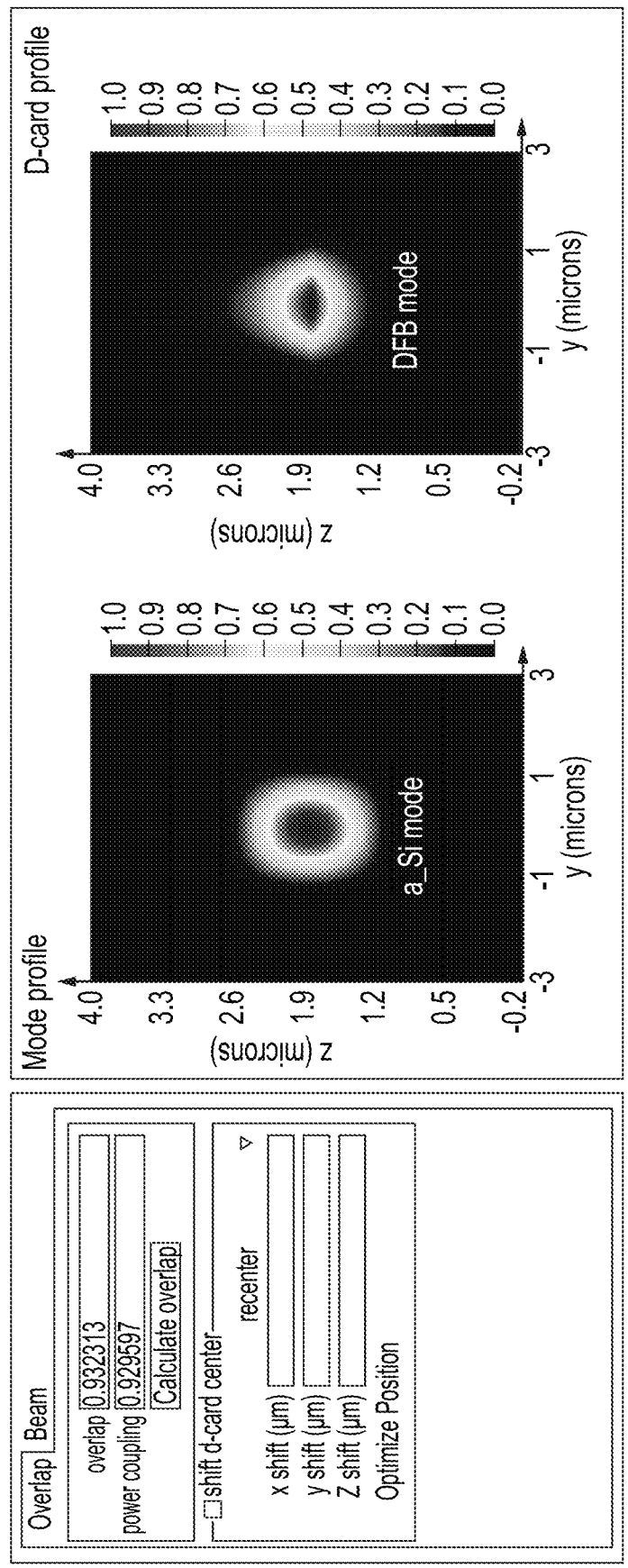

FIG. 14 shows simulated optical modes in various portions of the optoelectronic device of FIG. 1. The upper pair show the optical modes in a α-Si waveguide and the adjacent SOI waveguide. The mode coupling efficiency was found to be 99.28%, corresponding to mode mismatch loss of 0.003 dB. The middle pair show the optical modes in a α-Si waveguide and adjacent EAM III-V device coupon. The mode coupling efficiency was found to be 83.5%, corresponding to a mode mismatch loss of 0.783 dB. The lower pair show the optical modes in a α-Si waveguide and adjacent DFB III-V device coupon. The mode coupling efficiency was found to be 92.96%, corresponding to a mode mismatch loss of 0.317 dB.

Figure 15A:
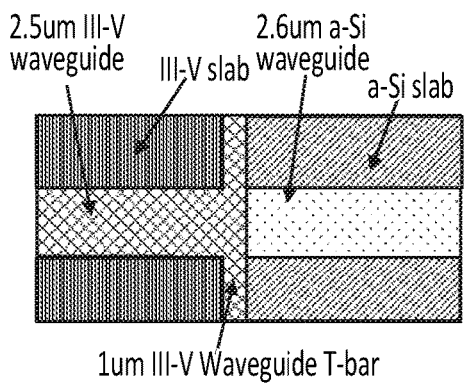
FIGS. 15A and 15B show top-down views of interfaces between an EAM and α-Si waveguide with and without T-bar interfaces formed in the α-Si waveguide.
Figure 15B:
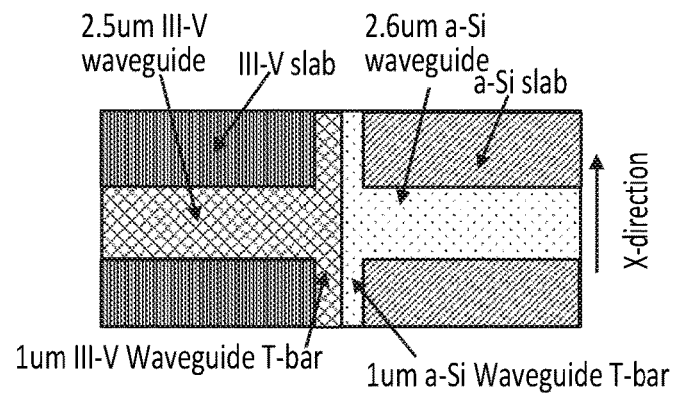

FIGS. 15A and 15B show top-down views of interfaces between an EAM and α-Si waveguide with and without T-bar interfaces formed in the α-Si waveguide. In FIG. 15A, the EAM III-V device coupon includes a T-bar interface adjacent to the α-Si waveguide. However the α-Si waveguide does not include a T-bar interface, and so has a width proximal to the III-V device coupon which is smaller than the bar of the T-bar interface. The T-bar interface in the III-V device coupon has a thickness (as measured parallel to a guiding direction of the waveguides) of around 1 μm. The III-V waveguide in the III-V device coupon has a width (as measured perpendicular to the guiding direction) of 2.5 μm. The α-Si waveguide has a width (as measured perpendicular to the guiding direction) of 2.6 μm. FIG. 15B is the same arrangement, but where the α-Si waveguide also includes a 1 μm thick T-bar interface.

Figure 16:
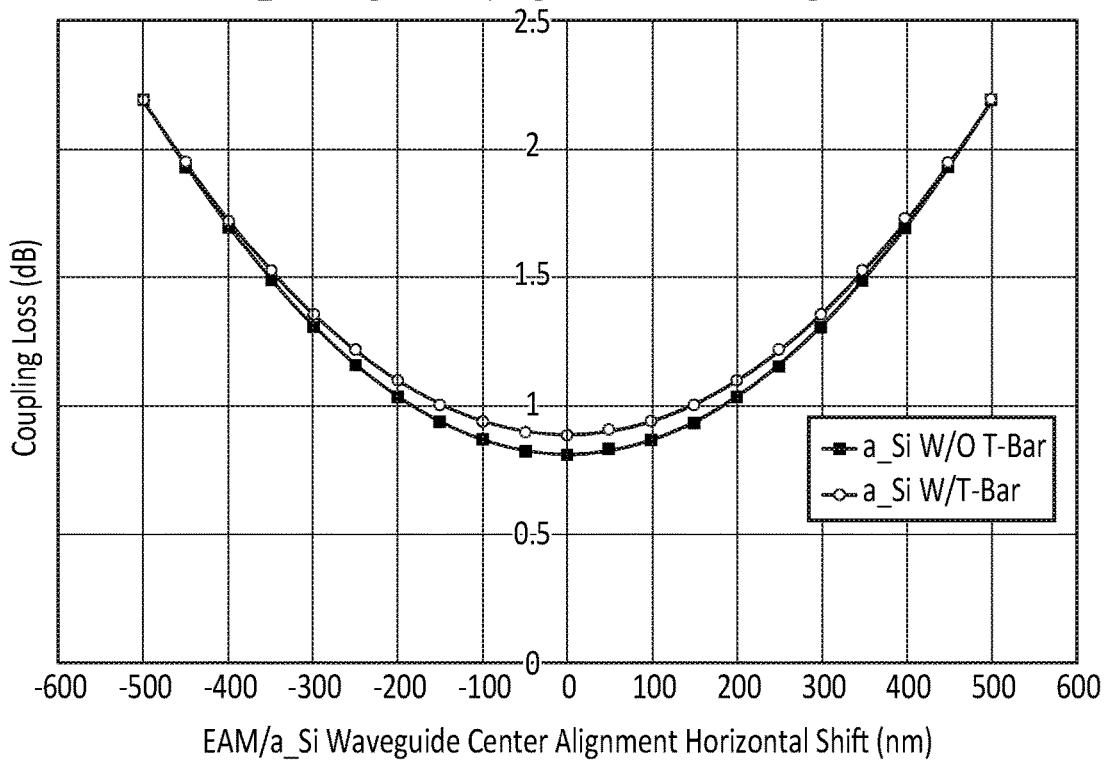
FIG. 16 is a plot of coupling loss against centre alignment horizontal shift for the interfaces in FIGS. 15A and 15B.

FIG. 16 is a plot of simulated coupling loss against centre alignment horizontal shift for the interfaces in FIGS. 15A and 15B, (finite-difference time-domain simulation at 1311 nm operating wavelength). As can be seen, examples where the α-Si waveguide includes a T-bar interface perform worse than examples without a T-bar interface with respect to coupling losses. This is likely due to the optical mode in the T-bar expanding, and so there is an extra loss in waveguides containing a T-bar than in those without.

Figure 17A:
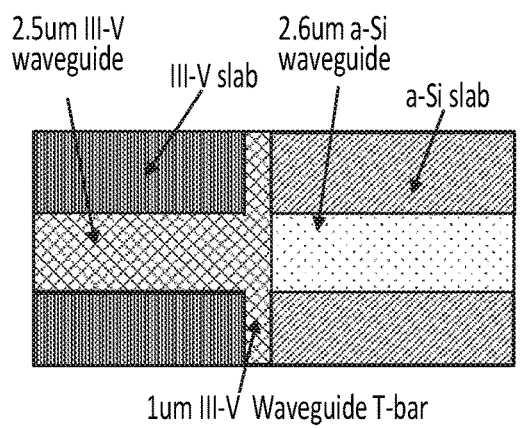
FIGS. 17A and 17B show top-down views of interfaces between a DFB laser and α-Si waveguide with and without T-bar interfaces formed in the α-Si waveguide.
Figure 17B:
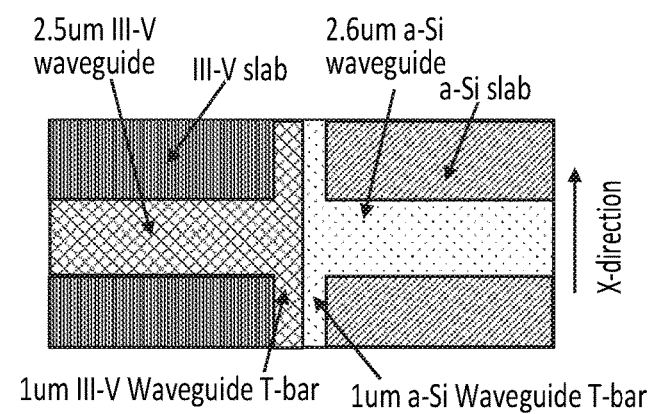

FIGS. 17A and 17B show top-down views of interfaces between a DFB laser and α-Si waveguide with and without T-bar interfaces formed in the α-Si waveguide. In FIG. 17A, the DFB III-V device coupon includes a T-bar interface adjacent to the α-Si waveguide. However the α-Si waveguide does not include a T-bar interface, and so has a width proximal to the III-V device coupon which is smaller than the bar of the T-bar interface. The T-bar interface in the III-V device coupon has a thickness (as measured parallel to a guiding direction of the waveguides) of around 1 μm. The III-V waveguide in the III-V device coupon has a width (as measured perpendicular to the guiding direction) of 2.5 μm. The α-Si waveguide has a width (as measured perpendicular to the guiding direction) of 2.6 μm. FIG. 15B is the same arrangement, but where the α-Si waveguide also includes a 1 μm thick T-bar interface.

Figure 18:
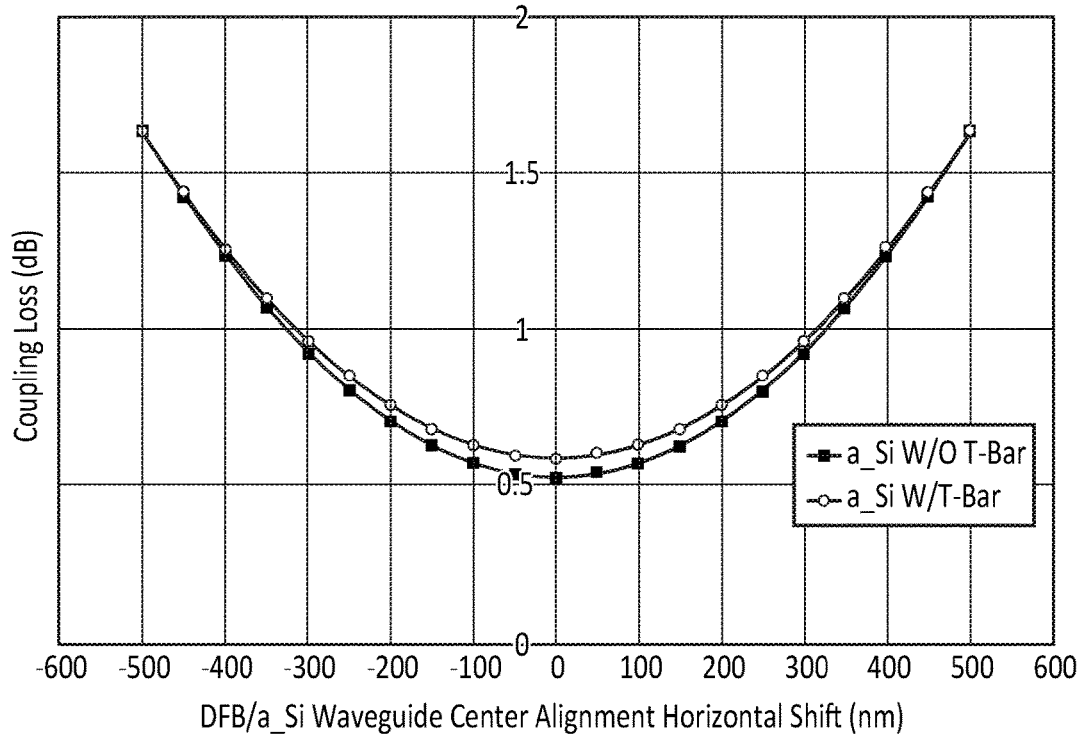
FIG. 18 is a plot of coupling loss against centre alignment horizontal shift for the interfaces in FIGS. 17A and 17B.

FIG. 18 is a plot of simulated coupling loss against centre alignment horizontal shift for the interfaces in FIGS. 17A and 17B (finite-difference time-domain simulation at 1311 nm operating wavelength). As can be seen, examples where the α-Si waveguide includes a T-bar interface perform worse than examples without a T-bar interface with respect to coupling losses.

Figure 19:
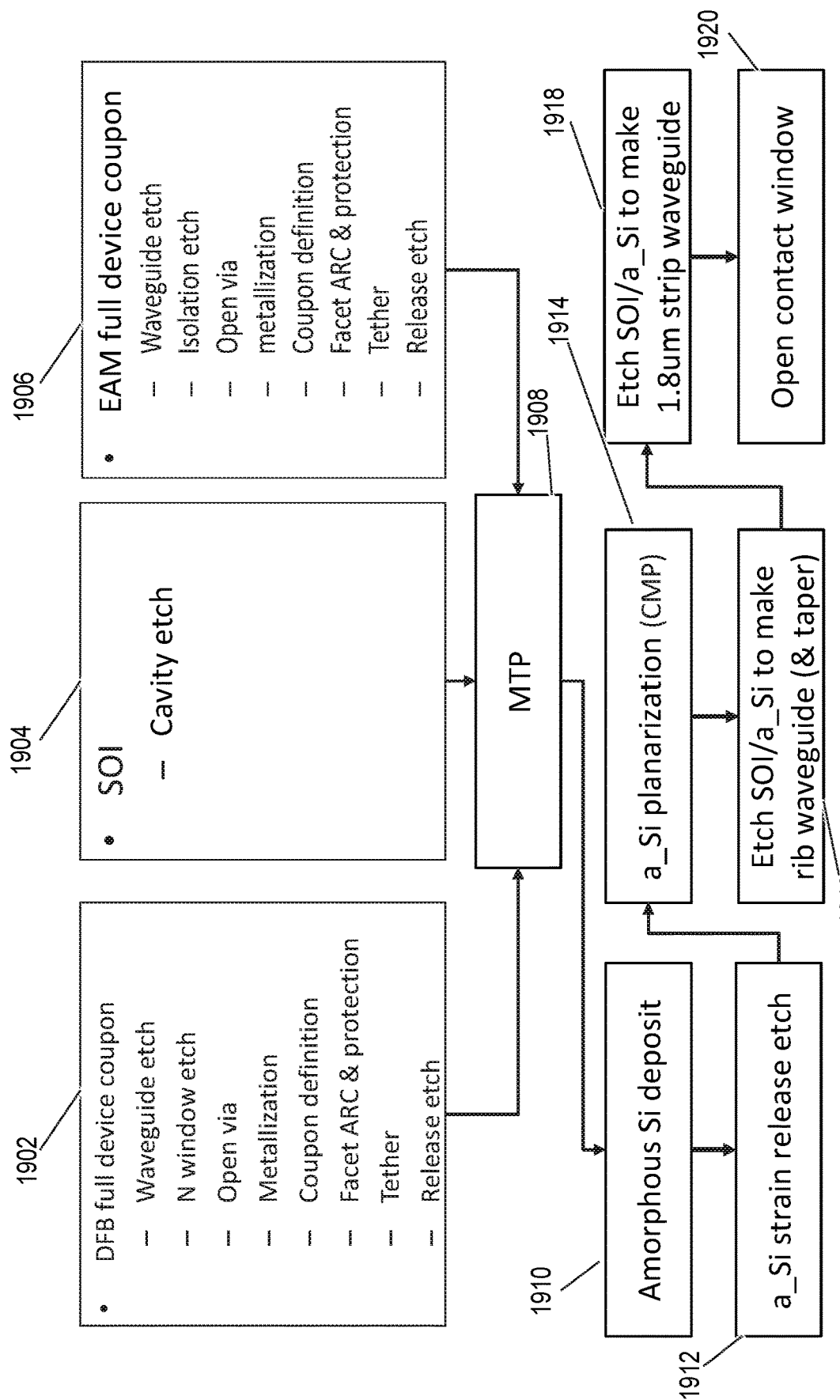
FIG. 19 shows a fabrication process.

FIG. 19 shows a fabrication process. Steps 1902-1906 can be performed in parallel or in series, and in any order. Step 1902 corresponds to the preparation of the full DFB device coupon, which in itself includes the sub-steps of: etching one or more waveguides; etching a via or window for the n-electrode provision; opening a via or window for the p-electrode; a metallization step to provide the p- and n-electrodes; a coupon definition step (in which e.g. the outer periphery of the coupon is defined and etched); a facet processing step (in which the anti-reflective coating and any protection layers are provided); a tether provision step; and a release etch. Step 1904 corresponds to the preparation of the silicon platform, which in itself includes a step of etching the cavity through the SOI and/or partially through the buried oxide layer. The etch into the cavity could be a single etch or it could be multiple etches, for example if different thicknesses of buried oxide layer are desired. Step 1906 corresponds to the preparation of the full EAM device coupon, which in itself includes the sub-steps of: etching one or more waveguides; performing an isolation etch (in which, e.g., an area of a stack forming the EAM is removed so as to isolate the contact pad of one polarity from layers containing dopants of the opposite polarity); opening vias for the electrodes; a metallization step to provide the p- and n-electrodes; a coupon definition step (in which, e.g., the outer periphery of the coupon is defined and etched; a facet processing step (in which the anti-reflective coating and any protection layers are provided); a tether provision step; and a release etch. The isolation etch in some examples etches away, sometimes a circular area, around the stack for the p-contact pad, which completely removes the n-doped layer(s) in this area and so isolates the layers in the stack for the p-contact pad from the rest of the n-doped layers in the device (or vice versa). This is done so as to reduce the parasitic capacitance, which provides higher operating speeds.

After steps 1902-1906 have been completed, the process moves to step 1908 in which the EAM and DFB device coupons are micro-transfer printed into respective cavities in the silicon platform. Subsequently, in step 1910, α-Si is deposited to fill the gap between the device coupons and the SOI waveguides. This α-Si is then partially etched in step 1912 to release strain in the material, and then planarized in step 1914 using a chemical-mechanical planarization process. After this, in step 1916, the SOI layer and α-Si regions are etched to make the rib or ridge waveguides and tapered regions. Subsequently, in step S1918, the SOI layer and α-Si regions are etched again to make the 1.8 μm tall strip waveguides. In step 1920, contact windows are opened to allow wire bonding.

Figure 20I:
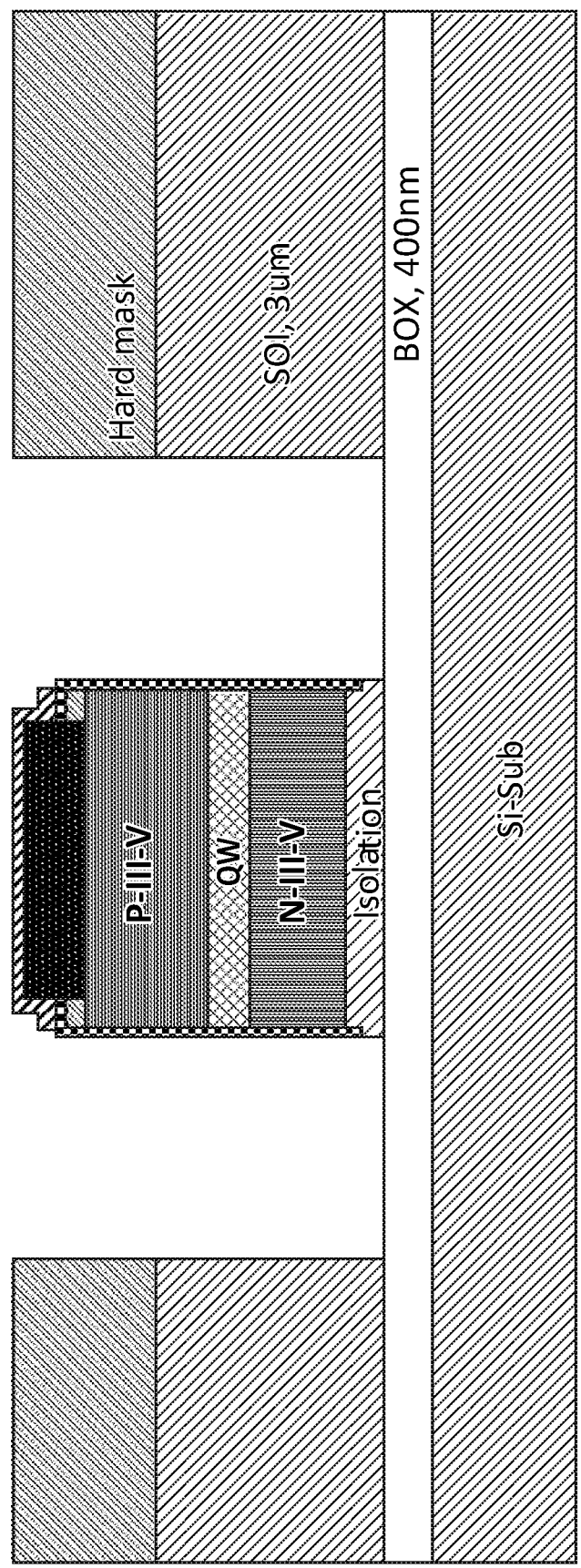
FIGS. 20(i)-20(viii) show various fabrication steps.
Figure 20:
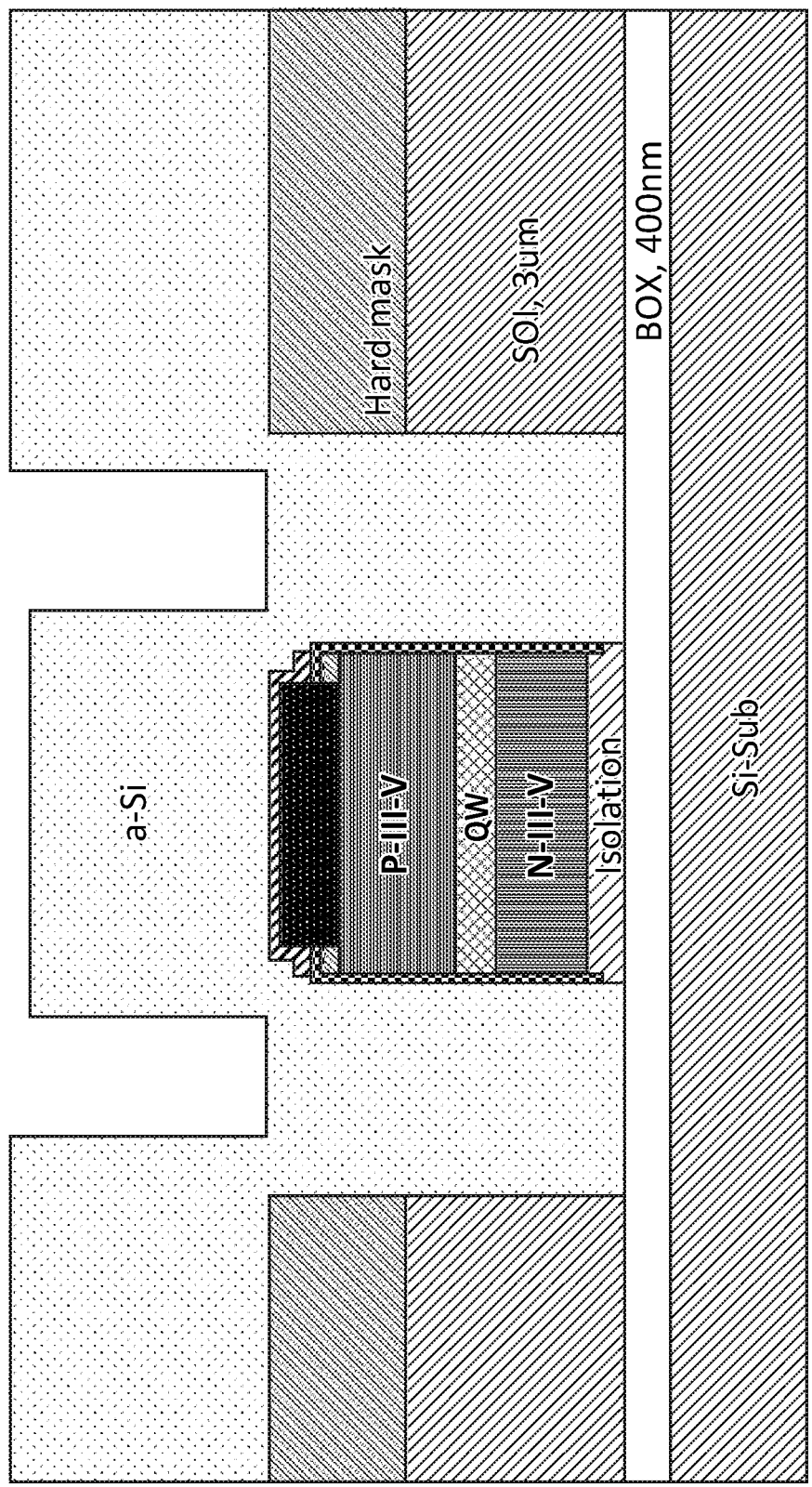
Figure 20:
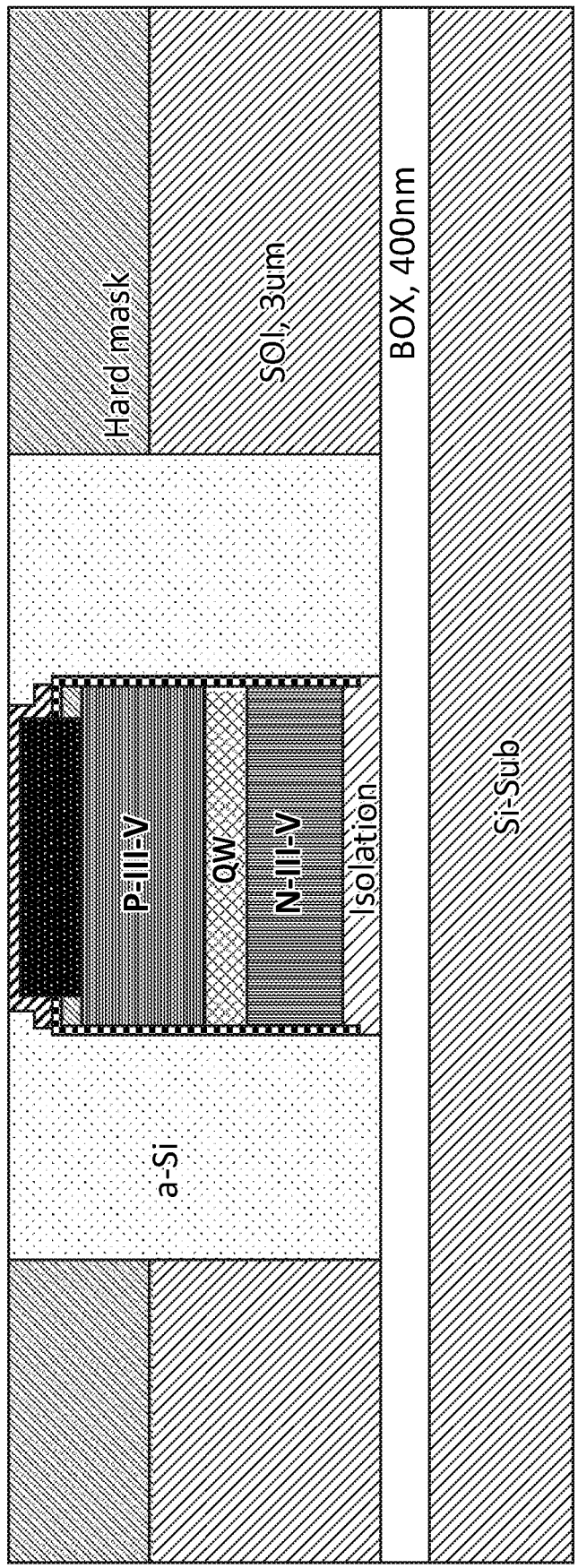
Figure 20V:
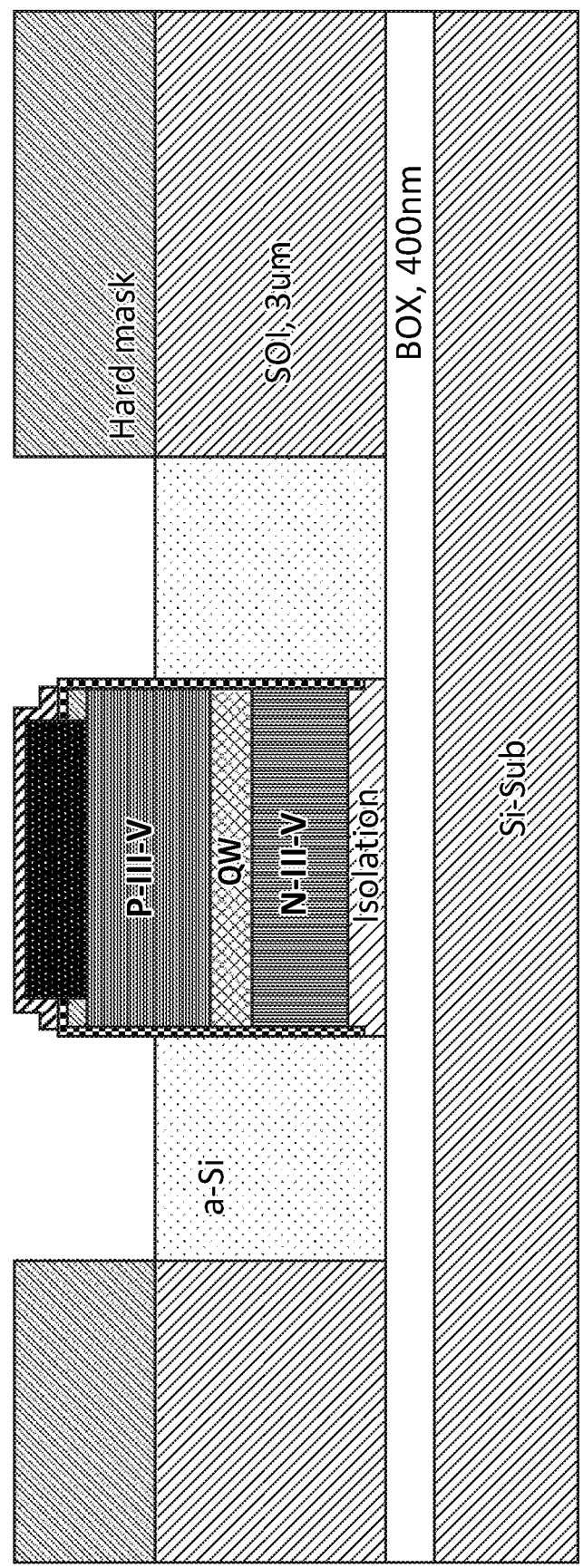
Figure 20:
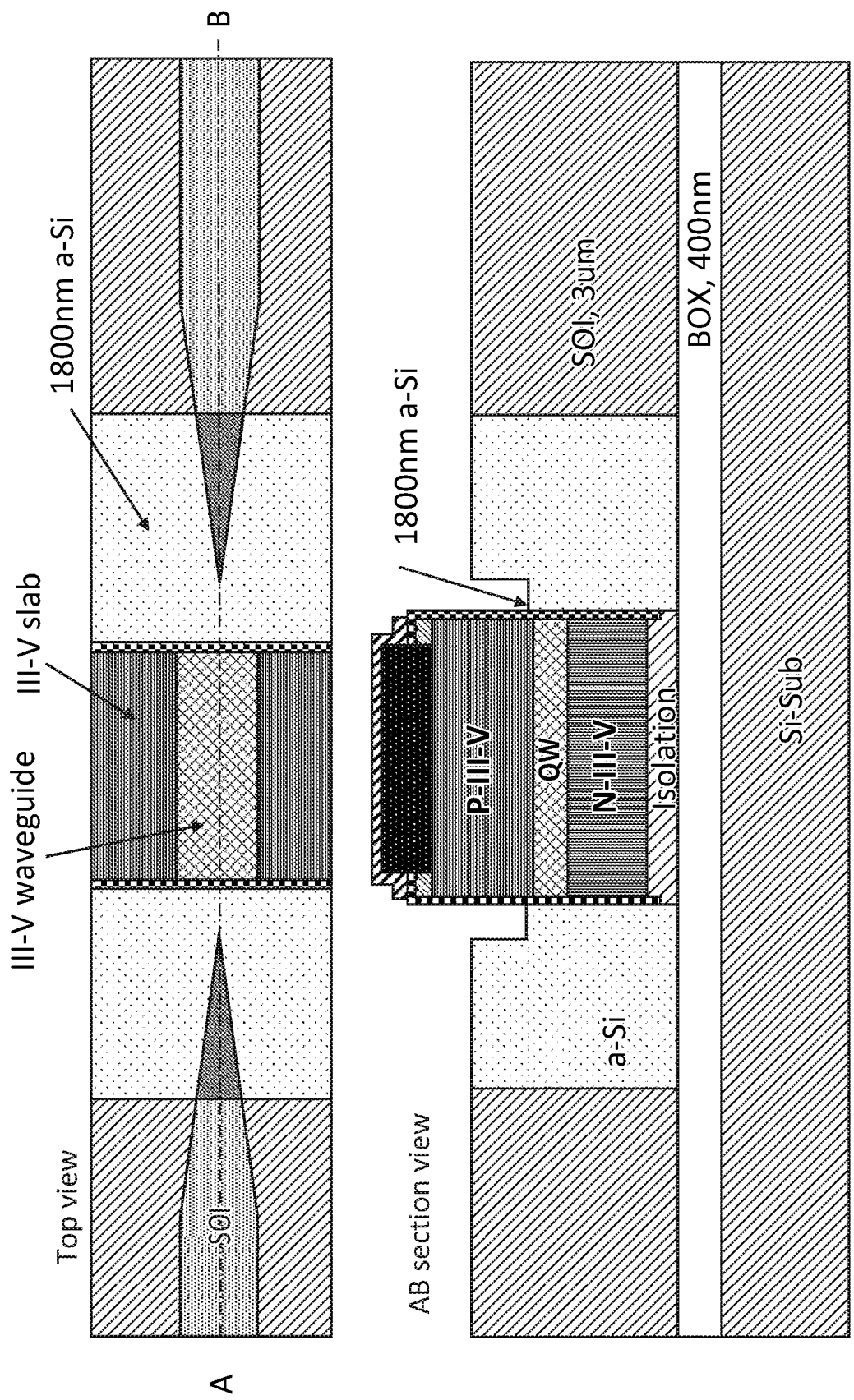

FIGS. 20(i)-20(viii) show various fabrication steps. FIG. 20(i) corresponds to step 1908, in which an EAM device coupon has been micro-transfer printed into a cavity of a silicon platform. In this example, the buried oxide layer has a uniform height but in other examples the height of the buried oxide layer may vary. The height is measured from the surface of the substrate Si-Sub adjacent to the buried oxide to a surface of the buried oxide layer distalmost from the substrate. The hard mask atop the SOI layer has a height which is the same as or higher than (as measured relative to the buried oxide layer) than the III-V device coupon. FIG. 20(*ii*) corresponds to step 1910, where α-Si has been bulk deposited (e.g. via chemical vapour deposition). FIG. 20(*iii*) corresponds to step 1912, in which the α-Si outside of the cavity (e.g. in a direction laterally around the cavity) is etched away to release stress in the α-Si material. FIG. 20(*iv*) corresponds to step 1914, in which the α-Si is subjected to a planarization process (e.g. chemical-mechanical planarization). The uppermost surface of the α-Si after this process is aligned with the uppermost surface of the hard mask and/or III-V device coupon. FIG. 20(*v*) shows a subsequent step in which the α-Si is etched so that the uppermost surface of it is aligned with the SOI device layer. FIG. 20(*vi*) corresponds to step 1916, showing a top-view and AB section view after the rib waveguide(s) and taper regions have been etched. FIG. 20(*vii*) corresponds to step 1918, showing a top-view and AB section view after the strip waveguide(s) have been etched. FIG. 20(*viii*) corresponds to step 1920, showing a top-view and AB section view after the contact window is opened.

Figure 21:
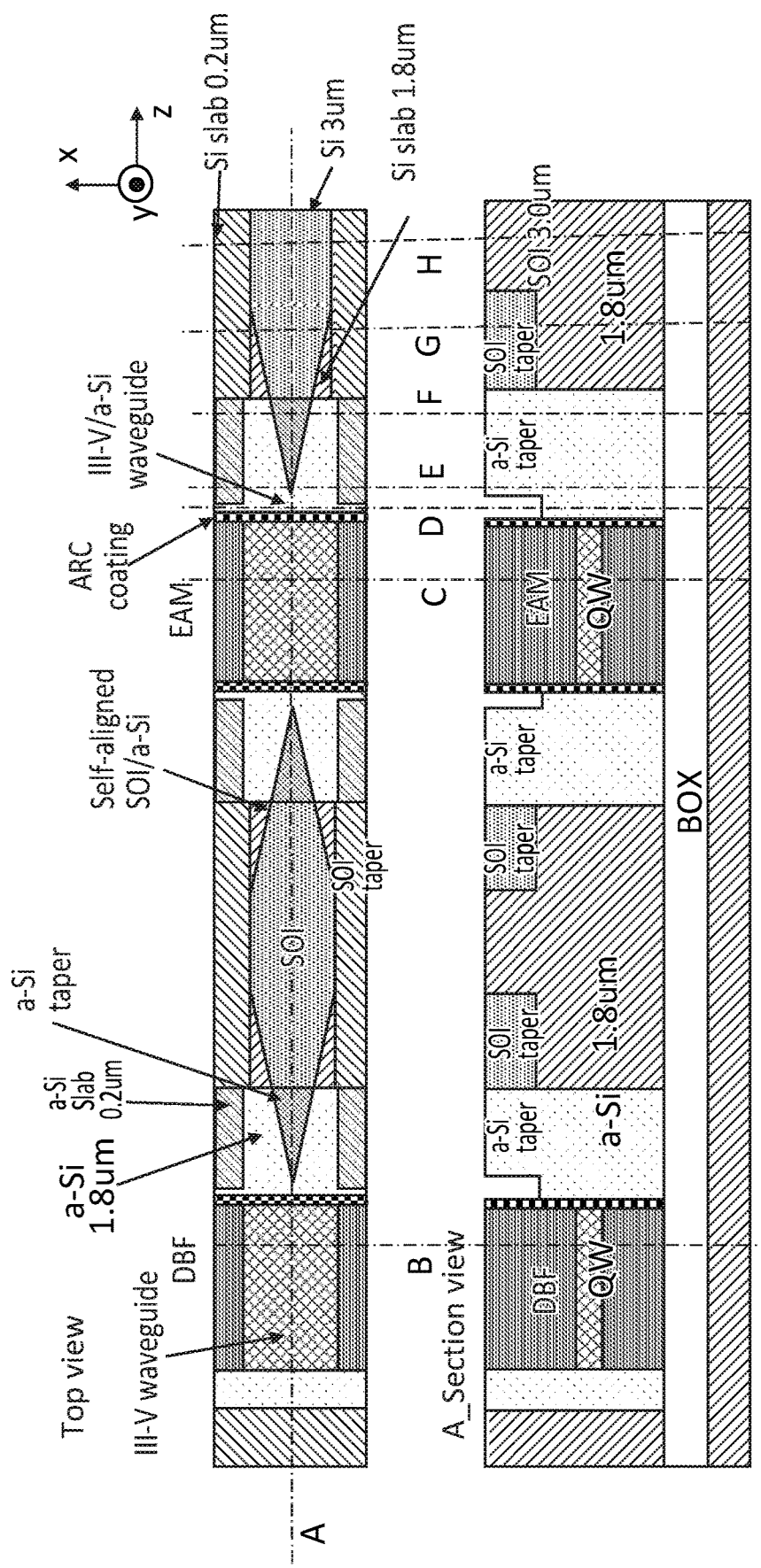
FIG. 21 shows a variant optoelectronic device.
Figure 22:
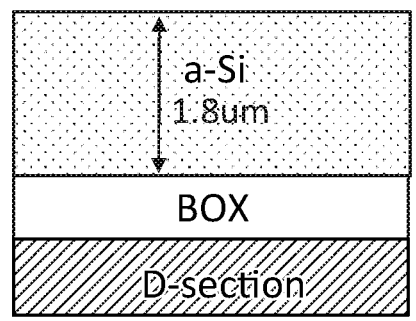
FIG. 22 shows a section view along the line D of the optoelectronic device of FIG. 21.

FIG. 21 shows a variant optoelectronic device. In contrast to the optoelectronic device shown in FIG. 1, the α-Si waveguides include T-bar interfaces as shown. FIG. 22 shows a section view along the line D of the optoelectronic device of FIG. 21. In contrast to the section view in FIG. 2D, the T-bar interface can be seen resulting in a uniform height of the α-Si waveguide.

Figure 23:
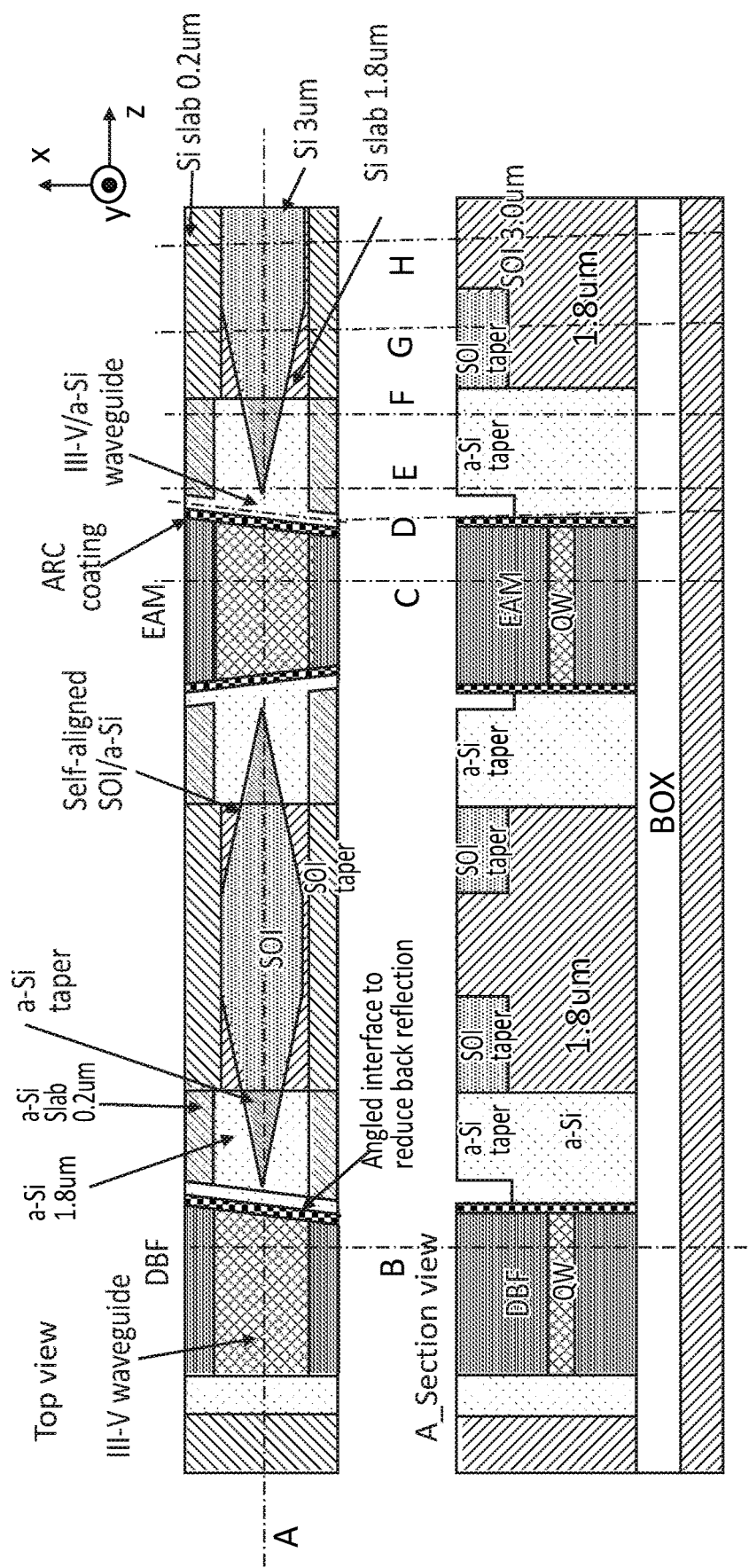
FIG. 23 shows a further variation of the optoelectronic device of FIG. 1.

FIG. 23 shows a further variation of the optoelectronic device of FIG. 1. It differs form the optoelectronic device of FIG. 1 in that the interfaces between the III-V waveguide(s) and α-Si waveguide(s) are angled, for example relative to the guiding direction, to reduce back reflection. That is, the interface is angled relative to the x-direction, and can be angled at, for example, 10°. In this example, the interface between the DFB laser and the first α-Si waveguide, the interface between the second α-Si waveguide and the EAM, and the interface between the EAM and the third α-Si waveguides are angled.

Figure 24:
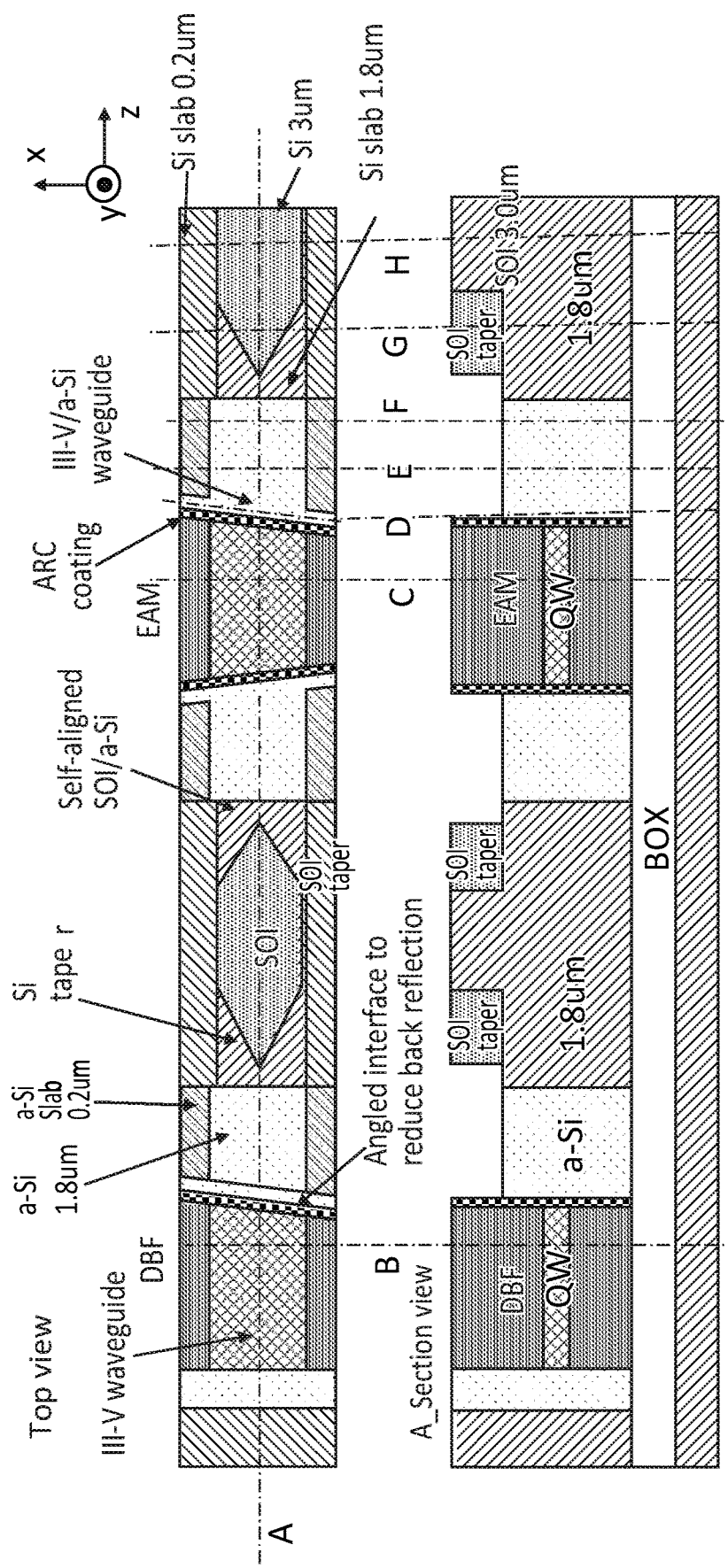
FIG. 24 shows a further variation of the optoelectronic device of FIG. 1.

FIG. 24 shows a further variation of the optoelectronic device of FIG. 1. It differs from the optoelectronic device both due to the angled interfaces discussed with respect to FIG. 23, but also due to the α-Si waveguides not including any taper region. Instead, only the SOI waveguide is tapered. In some examples, the interfaces are not angled but the lack of taper in the α-Si is retained.

Figure 25:
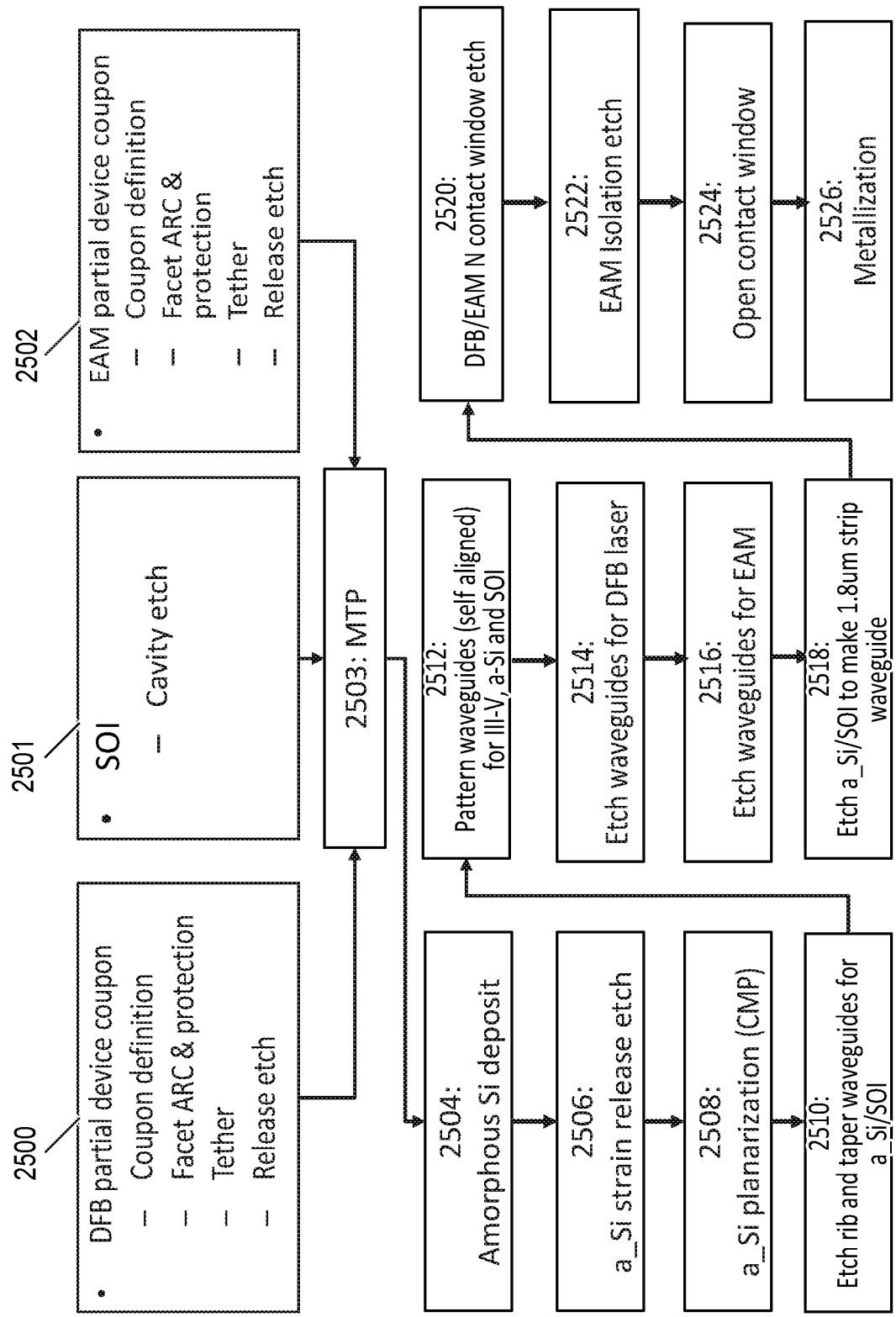
FIG. 25 shows a variant fabrication process.

FIG. 25 shows a variant fabrication process. It differs from the fabrication process shown in FIG. 19 in that the DFB and EAM device coupons are not fully prepared before they are bonded to the SOI platform. Steps 2500-2502 can be performed in parallel or in series, and in any order. Step 2500 corresponds to the partial preparation of the DFB device coupon, which in itself includes the sub-steps of: a coupon definition step (in which, e.g., the outer periphery of coupon is defined and etched); a facet processing step (in which the anti-reflective coating and any protection layers are provided); a tether provision step; and a release etch. Step 2501 corresponds to the preparation of the silicon platform, which in itself includes a step of etching the cavity through the SOI and/or partially through the buried oxide layer. Step 2502 corresponds to the partial preparation of the EAM device coupon, which in itself includes the sub-steps of: a coupon definition step (in which, e.g., the outer periphery of coupon is defined and etched); a facet processing step (in which the anti-reflective coating and any protection layers are provided); a tether provision step; and a release etch.

After steps 2500-2502 have been completed, the process moves to step 2503 in which the EAM and DFB device coupons are micro-transfer printed into respective cavities in the silicon platform. Subsequently, in step 2504, α-Si is deposited to fill the gap between the device coupons and the SOI waveguides. This α-Si is then partially etched in step 2506 to release strain in the material, and then planarized in step 2508 using a chemical-mechanical planarization process. After this, in step 2510, the SOI layer and α-Si regions are etched to make the rib or ridge waveguide and tapered regions, this etch having a depth of 1.2 µm. Next, in step 2512, the waveguides to be provided in the device coupons, α-Si, and SOI are patterned (that is, a mask is provided and then selectively removed, for example by lithography, so as to define the waveguides that are self aligned).

After this patterning, the waveguide(s) in the DFB device coupon are etched in step 2514 and the waveguide(s) in the EAM device coupon are etched in step 2516. After this, in step 2518, the α-Si and SOI layer are etched 1.6 µm again to make the 1.8 µm tall strip waveguides in α-Si and 3.0 µm strip waveguide in SOI. The n-electrode contact windows are then etched into both the DFB and EAM device coupons in step 2520. An EAM isolation etch is then performed in step 2522, and contact windows opened in the DFB and EAM device for the p-electrodes. A metallisation step is then performed in step 2526.

Figure 26I:
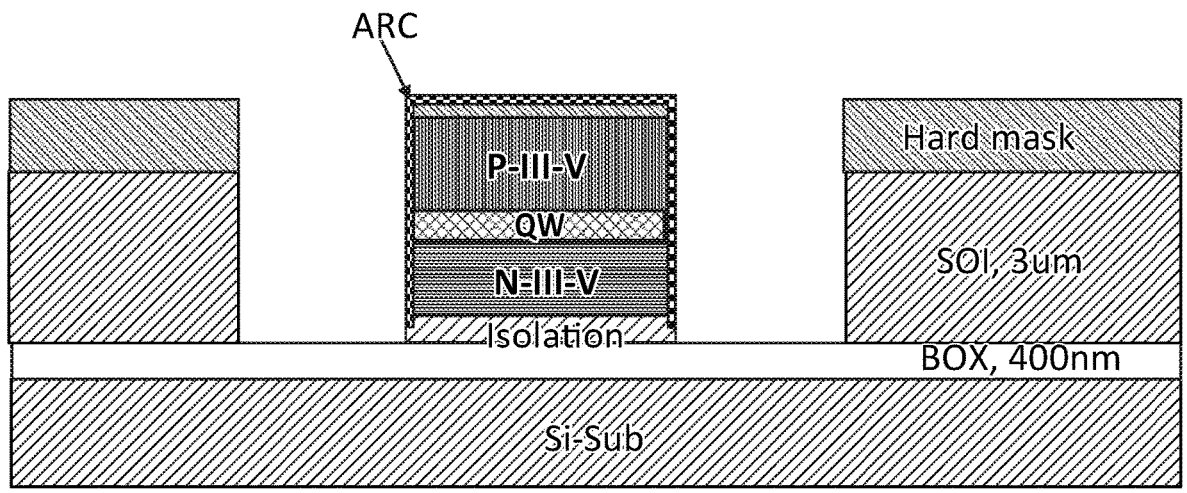
FIGS. 26(i)-26(xv) show various fabrication steps.
Figure 26:
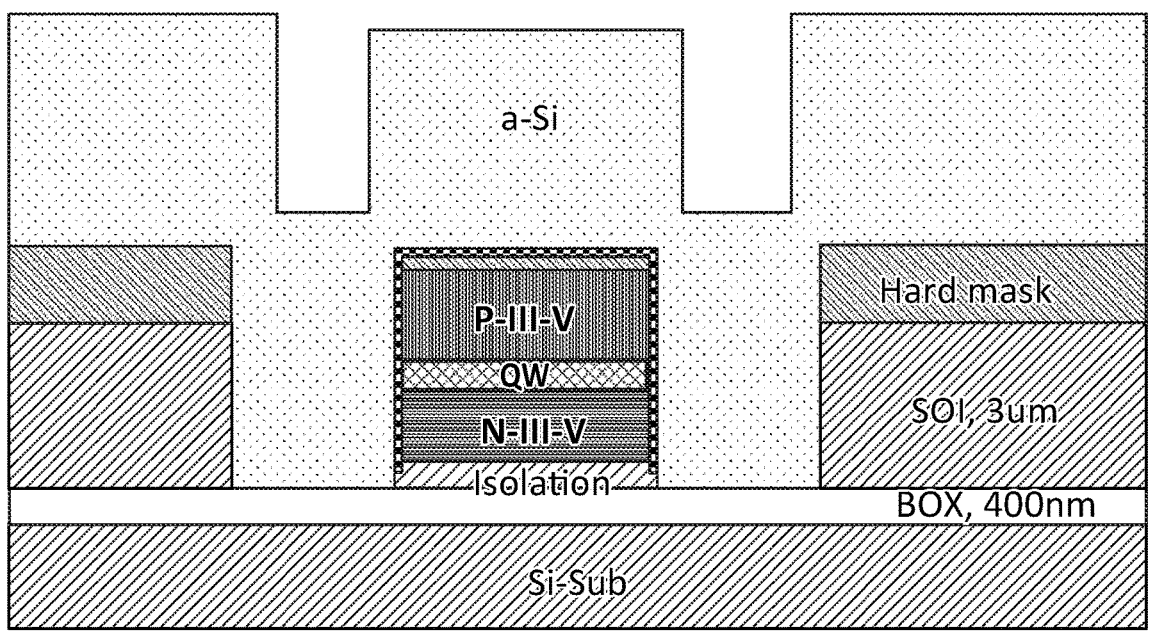
Figure 26:
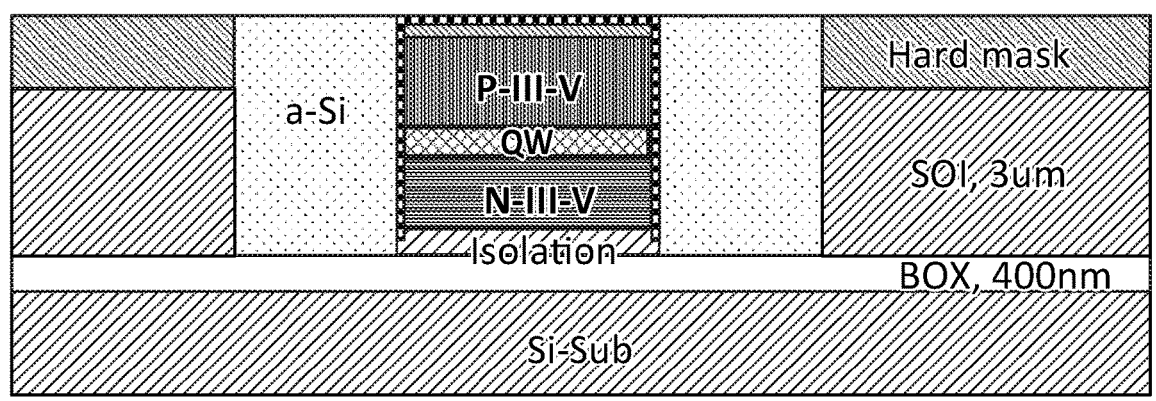
Figure 26V:
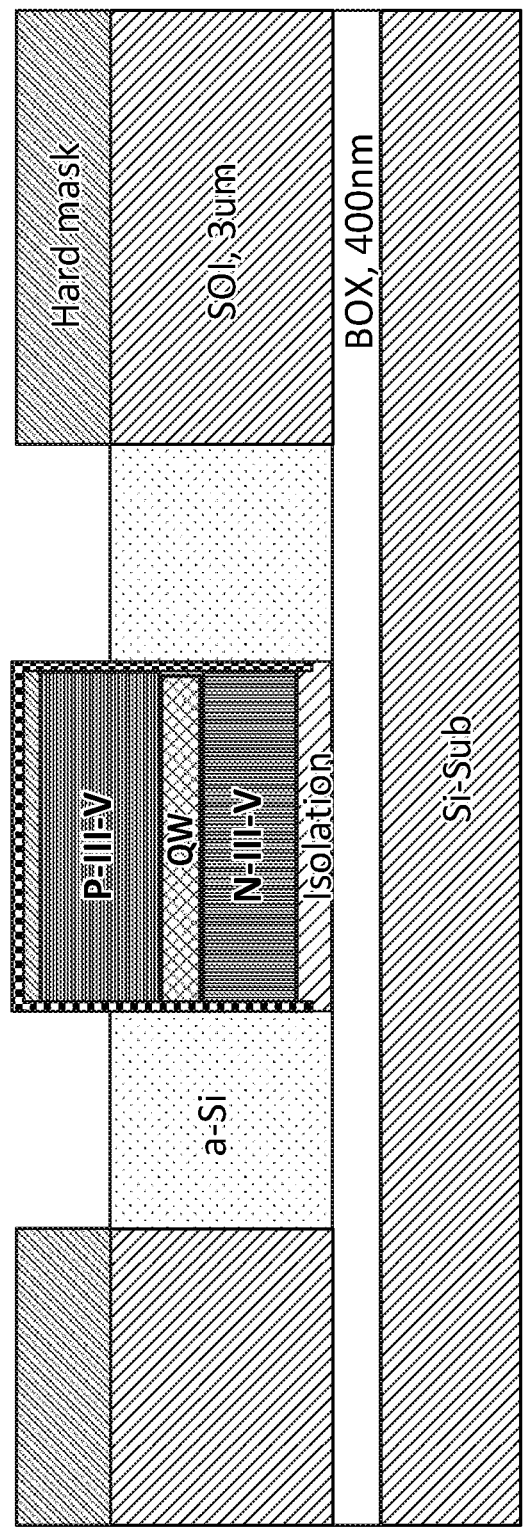
Figure 26:
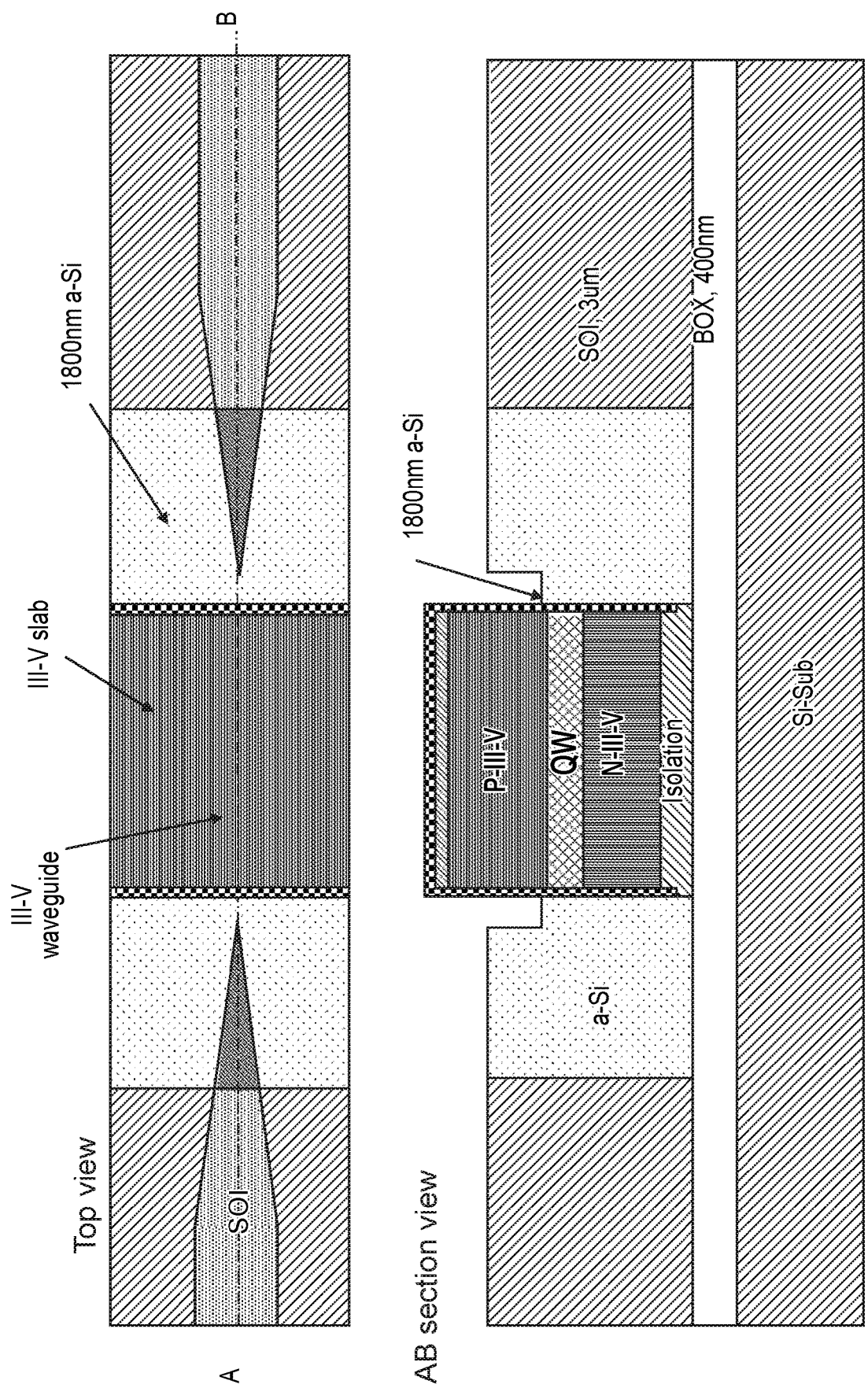
Figure 26:
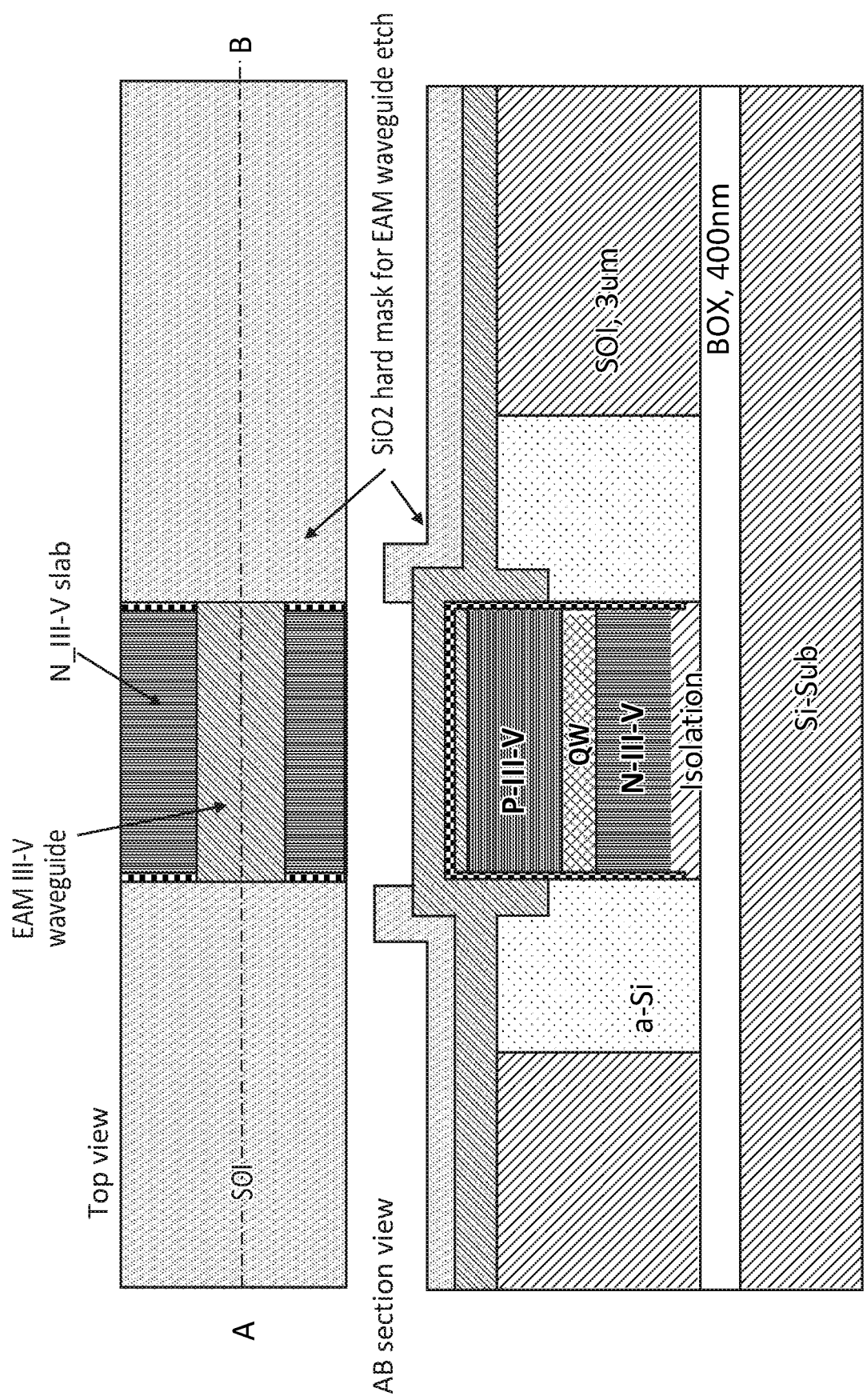
Figure 26X:
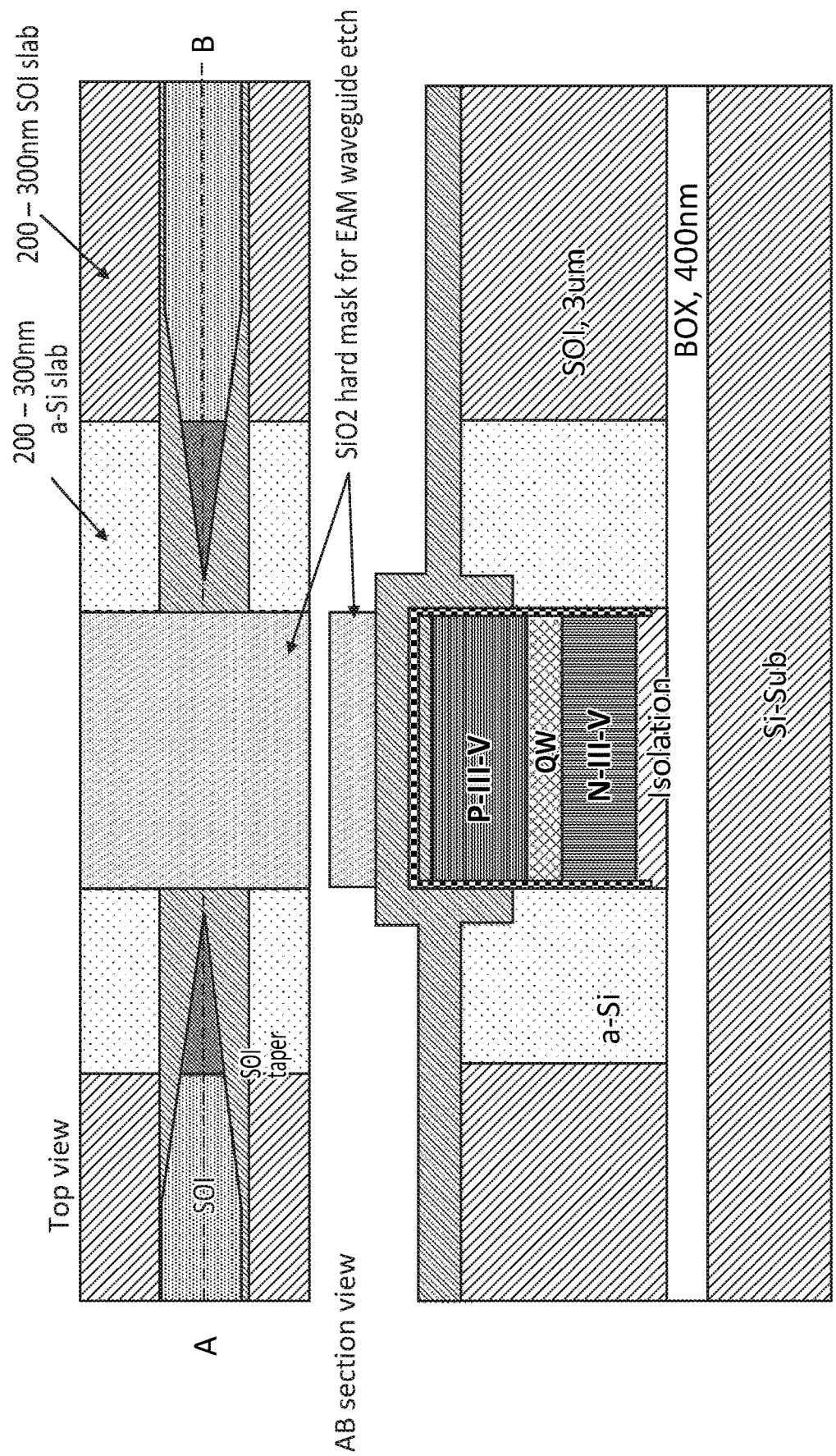
Figure 26:
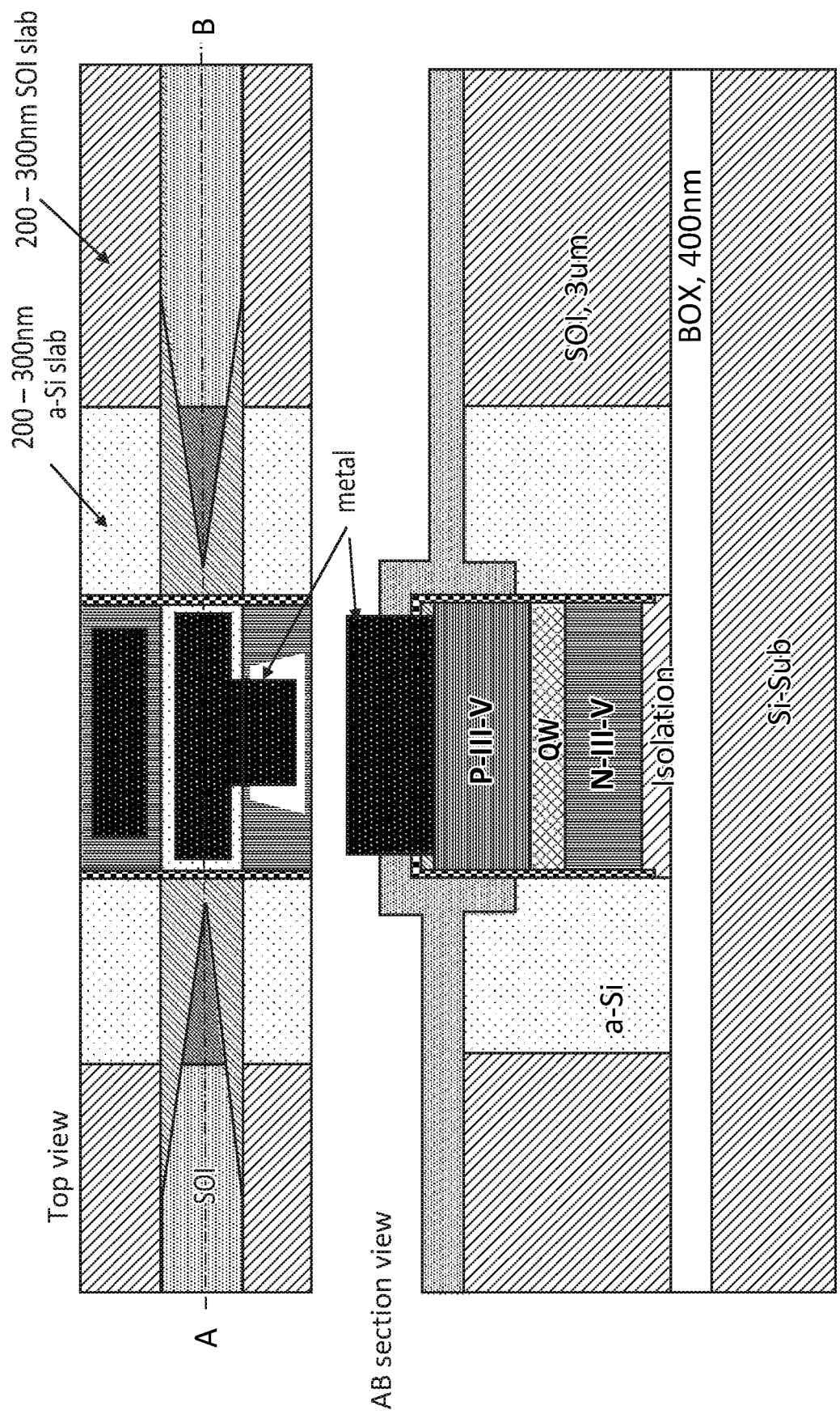

FIGS. 26(*i*)-26(*xv*) show various fabrication steps. FIG. 26(*i*) corresponds to step 2503 in which an EAM device coupon has been micro-transfer printed into a cavity of a silicon platform. The hard mask atop the SOI has a height which is the same as or higher than (as measured relative to the buried oxide) than the III-V device coupon. FIG. 26(*ii*) corresponds to step 2504 in which the α-Si is bulk deposited (e.g. via chemical vapour deposition). FIG. 26(*iii*) corresponds to step 2506 in which the α-Si outside of the cavity (e.g. in a direction laterally around the cavity) is etched away to release stress in the α-Si material. FIG. 26(*iv*) corresponds to step 2508, in which the α-Si is subjected to a planarization process (e.g. chemical-mechanical planarization). The uppermost surface of the α-Si after this process is aligned with the uppermost surface of the hard mask and/or III-V device coupon. FIG. 26(*v*) shows subsequent step in which the α-Si is etched so that the uppermost surface of it is aligned with the SOI device layer. FIG. 26(*vi*) corresponds to step 2510, showing a top-view and AB section view after the rib waveguide(s) and taper regions in the α-Si and SOI have been etched.

FIG. 26(*vii*) corresponds to step 2512, in that a hard mask (in this example $Si_3N_4$) is provided and patterned so as to define the waveguides in the III-V device coupons, the α-Si and, and the SOI layer. FIG. 26(*viii*) corresponds to step 2514, wherein the DFB waveguide(s) are etched for the DFB laser. FIG. 26(*ix*) corresponds to step 2516, in which the $SiO_2$ hard mask is stripped, re-deposited, and re-patterned to define the EAM waveguide(s). FIG. 26(*x*) corresponds to step 2518 in which the $SiO_2$ is again stripped, re-deposited, and re-patterned to define the α-Si and SOI strip waveguide(s). In FIG. 26(*xi*), the hard mask is stripped once more, and the waveguide etching steps are therefore complete. FIG. 26(*xii*) corresponds to step 2520, in which the n-electrode contact windows are etched. This exposes the n-doped regions of the EAM and DFB device coupons, and the n-electrode seed metal is fabricated. FIG. 26(*xiii*) corresponds to step 2522 in which the p-contact isolation area is etched in the EAM device coupon. FIG. 26(*xiv*) corresponds to step 2524, wherein the p-electrode and n-electrode contact windows are opened in the EAM and DFB device coupons such that the p-doped regions and n-electrode seed metal of each are exposed. FIG. 26(*xv*) corresponds to step 2526, in which a metallization process is performed so that an n-electrode and p-electrode are provided which contact the respective doped regions.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An optoelectronic device, the optoelectronic device including:
   a silicon platform, including:
      a silicon substrate;
      a buried oxide (BOX) layer above the silicon substrate;
      a silicon waveguide above the BOX layer; and
      a cavity, wherein a bed of the cavity is provided at least in part by the BOX layer;
   a III-V semiconductor-based optoelectronic component, bonded to the bed of the cavity of the silicon platform; and
   a bridge-waveguide comprising a slab and a ridge protruding from the slab, the bridge-waveguide being located between the silicon waveguide and the III-V semiconductor-based optoelectronic component and having a thickness, as measured in a direction from the silicon waveguide to the III-V semiconductor-based optoelectronic component, of 10 μm to 20 μm,
   wherein the BOX layer extends entirely beneath: the silicon waveguide, the III-V semiconductor-based optoelectronic component, and the bridge-waveguide, so as to separate them from the silicon substrate,
   wherein a height of the BOX layer, as measured from the silicon substrate, is uniform,
   wherein the bridge-waveguide includes a tapered region, tapering from a first width at a first position proximal to the III-V semiconductor-based optoelectronic component to a second width at a second position proximal to the silicon waveguide, wherein the first width is smaller than the second width, and
   wherein the ridge of the bridge-waveguide has:
      a first height, as measured from the BOX layer, at a third position between the III-V semiconductor-based optoelectronic component and the first position;
      a second height, as measured from the BOX layer, at the first position, the second height being greater than the first height; and
      the second height, as measured from the BOX layer, at the second position, and
   wherein the ridge of the bridge-waveguide has a two-tiered ridge comprising a first ridge portion, protruding from the slab, and a second ridge portion, protruding from the first ridge portion.

2. The optoelectronic device of claim 1, wherein the bridge-waveguide comprises amorphous silicon.

3. The optoelectronic device of claim 1, wherein the III-V semiconductor-based optoelectronic component includes an antireflective coating located adjacent to the bridge-waveguide.

4. The optoelectronic device of claim 3, wherein the antireflective coating includes plural layers.

5. The optoelectronic device of claim 4, wherein the plural layers are silicon based.

6. The optoelectronic device of claim 4, wherein the plural layers include: a first silicon dioxide layer, a silicon nitride layer, and a second silicon dioxide layer, wherein the silicon nitride layer is interposed between the first silicon dioxide layer and the second silicon dioxide layer.

7. The optoelectronic device of claim 3, wherein the III-V semiconductor-based optoelectronic component includes an isolation layer, and the antireflective coating extends from the isolation layer up a lateral facet of the III-V semiconductor-based optoelectronic component.

8. The optoelectronic device of claim 1, wherein the III-V semiconductor-based optoelectronic component includes a T-bar interface between the III-V semiconductor-based optoelectronic component and the bridge-waveguide.

9. The optoelectronic device of claim 1, wherein the bridge-waveguide includes a T-bar interface between the bridge-waveguide and the III-V semiconductor-based optoelectronic component.

10. The optoelectronic device of claim 1, wherein an interface between the III-V semiconductor-based optoelectronic component and the bridge-waveguide is angled relative to a transmission direction of light through the bridge-waveguide.

11. The optoelectronic device of claim 1, wherein the silicon waveguide includes a tapered region, tapering from a third width proximal to the bridge-waveguide to a fourth width distal to the bridge-waveguide, wherein the third width is smaller than the fourth width.

12. The optoelectronic device of claim 1, wherein the bridge-waveguide and the silicon waveguide include a tapered region, tapering from the first width at the first position along the bridge-waveguide to a third width at a third position along the silicon waveguide, wherein the first width is smaller than the third width.

13. The optoelectronic device of claim 1, wherein the silicon waveguide includes a slab region and ridge region.

14. A method of manufacturing the optoelectronic device of claim 1, the method including steps of:
bonding the III-V semiconductor-based optoelectronic component to the bed of the cavity such that there is a space between the III-V semiconductor-based optoelectronic component and a sidewall of the cavity; and
filling the space between the III-V semiconductor-based optoelectronic component and the sidewall with a bridge-waveguide material.

15. The method of claim 14, wherein the method includes a step, after bonding the III-V semiconductor-based optoelectronic component, of performing one or more further processing steps on the III-V semiconductor-based optoelectronic component.

16. The method of claim 15, wherein the one or more further processing steps include one or more of the following:
a waveguide etch, an isolation etch, a via opening etch, and a metallisation step.

17. The method of claim 15, wherein the one or more further processing steps includes a waveguide patterning step, in which waveguides are simultaneously patterned in each of the III-V semiconductor-based optoelectronic component, the bridge-waveguide material, and the silicon platform.

18. The method of claim 17, wherein the waveguides patterned in the bridge-waveguide material and silicon platform are etched simultaneously.

* * * * *